(12) United States Patent
Murakami et al.

(10) Patent No.: US 7,235,313 B2
(45) Date of Patent: *Jun. 26, 2007

(54) MAGNETO-OPTICAL RECORDING MEDIUM, METHOD OF MANUFACTURING MAGNETO-OPTICAL RECORDING MEDIUM, METHOD OF RECORDING ON MAGNETO-OPTICAL RECORDING MEDIUM, AND METHOD OF REPRODUCTION FROM MAGNETO-OPTICAL RECORDING MEDIUM

(75) Inventors: Motoyoshi Murakami, Osaka (JP); Masahiro Birukawa, Osaka (JP)

(73) Assignee: Matsushita Electic Industrial Co., Ltd., Osaka (JP)

( * ) Notice: Subject to any disclaimer, the term of this patent is extended or adjusted under 35 U.S.C. 154(b) by 40 days.

This patent is subject to a terminal disclaimer.

(21) Appl. No.: 10/681,567

(22) Filed: Oct. 8, 2003

(65) Prior Publication Data

US 2004/0121189 A1    Jun. 24, 2004

(30) Foreign Application Priority Data

Oct. 8, 2002    (JP)    .............................. 2002-295441

(51) Int. Cl.
*G11B 11/105*    (2006.01)
(52) U.S. Cl. ............... 428/820.2; 428/819.2; 428/820.4; 369/13.4; 369/13.49; 369/13.5; 369/13.53

(58) Field of Classification Search ................... None
See application file for complete search history.

(56) References Cited

U.S. PATENT DOCUMENTS

| | | | | |
|---|---|---|---|---|
| 5,106,703 | A * | 4/1992 | Carcia | ......................... 428/635 |
| 5,184,400 | A * | 2/1993 | Cray et al. | ................... 29/879 |
| 5,993,937 | A * | 11/1999 | Birukawa et al. | ........... 428/141 |
| 6,150,015 | A * | 11/2000 | Bertero et al. | .............. 428/332 |
| 6,399,174 | B1 | 6/2002 | Shiratori et al. | |
| 6,403,148 | B1 | 6/2002 | Shiratori et al. | |
| 2003/0134154 | A1* | 7/2003 | Kirino et al. | ......... 428/694 SC |
| 2005/0086679 | A1* | 4/2005 | Murakami et al. | .......... 720/718 |

FOREIGN PATENT DOCUMENTS

| | | | |
|---|---|---|---|
| JP | 06-020313 A | * | 1/1994 |
| JP | 6-290496 | | 10/1994 |
| WO | WO 03/046905 | | 6/2003 |

OTHER PUBLICATIONS

JPO Abstract Translation of JP 06-020313-A (JPO Doc. ID: JP 06020313A).*
English Language Translation of JP 06-020313 A (PTO 06-2158).*

* cited by examiner

*Primary Examiner*—Kevin M. Bernatz
(74) *Attorney, Agent, or Firm*—RatnerPrestia

(57) ABSTRACT

A magneto-optical medium has a recording layer having a plurality of columns extending in a lamination direction, and a reproduction layer which is placed below the recording layer and which functions as a nucleus for the columns.

31 Claims, 8 Drawing Sheets

MAGNETO-OPTICAL RECORDING MEDIUM, METHOD OF MANUFACTURING MAGNETO-OPTICAL RECORDING MEDIUM, METHOD OF RECORDING ON MAGNETO-OPTICAL RECORDING MEDIUM, AND METHOD OF REPRODUCTION FROM MAGNETO-OPTICAL RECORDING MEDIUM

BACKGROUND OF THE INVENTION

1. Field of the Invention

The present invention relates to a magneto-optical recording medium for recording or erasing information by utilizing an increase in temperature caused by irradiation with laser light and for reading a recorded signal by utilizing a magneto-optical effect; a method of manufacturing the magneto-optical recording medium; a method of recording on the magneto-optical recording medium; and a method of reproduction from the magneto-optical recording medium.

2. Related Art of the Invention

Optical memories capable of reproduction of information by detecting reflected light from a irradiated light beam. Types of optical memories include a read-only memory (ROM) in which information is recorded as phase pits, and a write once type of optical memory in which holes are formed in a recording film by irradiation with a light beam to record information. Other types include a phase change type of optical memory in which a crystalline phase in a recording film is changed by irradiation with a light beams to record information, and a magneto-optical memory in which the direction of magnetization of a recording layer is changed by irradiation with a light beam and application of a magnetic field to record information.

In these optical memories, the resolution at which a signal is reproduced is virtually determined by the wavelength $\lambda$ of reproduction light and the numerical aperture (N. A.) of the objective lens, and a detection limit pit cycle is approximately $\lambda/[2 \cdot (N. A.)]$.

However, it is difficult to reduce the wavelength of reproduction light or increase the numerical aperture of the objective lens. Attempts have therefore been made to increase the information recording density by devising a recording medium or a reproduction method.

In particular, various means or methods for increasing the information recording density in magneto-optical recording mediums on a trial basis have been proposed.

For example, a technique is known which improves the reproduction resolution exceeding the above-described detection limit determined by the wavelength and the numerical aperture of the objective lens in such a manner magnetic domain walls coming near to a reproducing light beam are successively displaced and the displacement of each domain wall is detected (see Japanese Patent Laid-Open No. 6-290496).

The disclosure in Japanese Patent Laid-Open No. 6-290496 is incorporated herein by reference in its entirety.

In this technique, a particularly improved reproduction signal can be obtained if a reproduction layer which is a first magnetic layer in which each of magnetic domain walls is displaced when it comes near to a reproducing light beam is magnetically separated between each adjacent pair of information tracks.

Needless to say, in a case where microscopic recording magnetic domains in a recording layer in which information is recorded at a high density are transferred into a reproduction layer, and where the recorded information is reproduced by displacing domain walls in the reproduction layer or by a like method, it is necessary that the microscopic magnetic domains in the recording layer be maintained with stability and strongly and stably transferred into the reproduction layer by magnetic coupling.

However, the vertical magnetic anisotropy of the recording layer can be reduced, depending on the composition of the recording film and the film forming method. In some cases, therefore, it is difficult to form microscopic recording magnetic domains in the recording layer with stability.

Also, stable magnetic coupling using the vertical anisotropy of the recording layer is necessary for transfer of recording magnetic domains from the recording layer into the reproduction layer. In a case where the transferability changes depending on magnetic characteristics of the recording layer so that the stability of transfer is low, transfer noise and noise accompanying a domain wall displacement may be increased to such an extent that the reproduction signal quality is considerably reduced.

To effect a domain wall displacement with stability, a method of effecting magnetic separation between information tracks by laser annealing, a method of effecting shutoff between information tracks by using an optical disk substrate having a land/groove configuration, or the like is used. However, the characteristics of transfer from the recording layer into the reproduction layer may change, depending on laser annealing conditions or the land/groove configuration of the optical disk substrate, to such an extent that the influence of groove noise from the optical disk substrate is considerably large.

In particular, if the groove depth is large or the groove width is small in the case of groove recording, the shape of recording magnetic domains may change, depending on the microscopic structure of recording layer, to such an extent that the amount of signal in reproduction by transfer into the reproduction layer is reduced considerably.

As described above, there is a possibility of failure to obtain a sufficiently high recording density or transfer rate in magneto-optical recording.

In view of the above-described problems of the conventional art, an object of the present invention is to provide a magneto-optical recording medium capable of improving the recording density and the transfer rate in magneto-optical recording, a method of manufacturing the magneto-optical recording medium, a method of recording on the magneto-optical recording medium, and a method of reproduction from the magneto-optical recording medium.

The present invention can provide a magneto-optical recording medium capable of improving the recording density and the transfer rate in magneto-optical recording, a method of manufacturing the magneto-optical recording medium, a method of recording on the magneto-optical recording medium, and a method of reproduction from the magneto-optical recording medium.

SUMMARY OF THE INVENTION

The $1^{st}$ aspect of the present invention is a magneto-optical recording medium comprising:

a recording layer having a plurality of columns; and a first under layer which is placed below said recording layer and which functions as a nucleus for said columns, wherein the plurality of columns extends in a direction perpendicular to the layers.

The $2^{nd}$ aspect of the present invention is the magneto-optical recording medium according to the $1^{st}$ aspect of the present invention, further comprising a second under layer which is placed between said recording layer and said first under layer and through which the width of said columns is controlled.

The $3^{rd}$ aspect of the present invention is the magneto-optical recording medium according to the $1^{st}$ aspect of the present invention, wherein said first under layer is a magnetic thin film of an amorphous structure.

The $4^{th}$ aspect of the present invention is the magneto-optical recording medium according to the $2^{nd}$ aspect of the present invention, wherein said second under layer is a magnetic thin film of an amorphous structure.

The $5^{th}$ aspect of the present invention is the magneto-optical recording medium according to the $1^{st}$ aspect of the present invention, wherein said first under layer is formed as a portion of said recording layer.

The $6^{th}$ aspect of the present invention is the magneto-optical recording medium according to the $2^{nd}$ aspect of the present invention, wherein said second under layer is formed as a portion of said recording layer.

The $7^{th}$ aspect of the present invention is the magneto-optical recording medium according to the $1^{st}$ aspect of the present invention, wherein said first under layer has on the side of said recording layer a portion in which the density is changed.

The $8^{th}$ aspect of the present invention is the magneto-optical recording medium according to the $1^{st}$ aspect of the present invention, wherein the width of a structural unit of said first under layer is substantially 2 nm or less.

The $9^{th}$ aspect of the present invention is the magneto-optical recording medium according to the $1^{st}$ aspect of the present invention, wherein said first under layer takes in substantially 0.5 mol % or more inert gas.

The $10^{th}$ aspect of the present invention is the magneto-optical recording medium according to the $1^{st}$ aspect of the present invention, wherein the film thickness of said first under layer is substantially within the range from 5 to 50 nm.

The $11^{th}$ aspect of the present invention is the magneto-optical recording medium according to the $2^{nd}$ aspect of the present invention, wherein said second under layer has a plurality of columns extending in the direction perpendicular to the layers.

The $12^{th}$ aspect of the present invention is the magneto-optical recording medium according to the $11^{th}$ aspect of the present invention, wherein the width of the columns of said second under layer is substantially within the range from 2 to 40 nm.

The $13^{th}$ aspect of the present invention is the magneto-optical recording medium according to the $2^{nd}$ aspect of the present invention, wherein the film thickness of said second under layer is substantially within the range from 5 to 50 nm.

The $14^{th}$ aspect of the present invention is the magneto-optical recording medium according to the $3^{rd}$ aspect of the present invention, wherein said amorphous structure is an amorphous structure which is random on the order of atoms.

The $15^{th}$ aspect of the present invention is the magneto-optical recording medium according to the $1^{st}$ aspect of the present invention, wherein the width of the columns of said recording layer is larger than the width of the structural unit of said first under layer.

The $16^{th}$ aspect of the present invention is the magneto-optical recording medium according to the $1^{st}$ aspect of the present invention, wherein said recording layer is more porous than said first under layer.

The $17^{th}$ aspect of the present invention is the magneto-optical recording medium according to the $1^{st}$ aspect of the present invention, wherein said recording layer is magnetically coupled to said first under layer.

The $18^{th}$ aspect of the present invention is the magneto-optical recording medium according to the $2^{nd}$ aspect of the present invention, wherein said recording layer is magnetically coupled to said second under layer.

The $19^{th}$ aspect of the present invention is the magneto-optical recording medium according to the $1^{st}$ aspect of the present invention, wherein the width of a structural unit of columns in said recording layer is substantially within the range from 2 to 40 nm.

The $20^{th}$ aspect of the present invention is the magneto-optical recording medium according to the $1^{st}$ aspect of the present invention, wherein the density of said recording layer is substantially within the range from 2.0 to 5.0 g/cm$^3$.

The $21^{st}$ aspect of the present invention is the magneto-optical recording medium according to the $1^{st}$ aspect of the present invention, wherein the film thickness of said recording layer is substantially within the range from 40 to 300 nm.

The $22^{nd}$ aspect of the present invention is the magneto-optical recording medium according to the $2^{nd}$ aspect of the present invention, wherein said recording layer is formed of a thin film of an alloy of a predetermined rare-earth metal and a predetermined transition metal;

said first under layer is formed of a thin film of an alloy of a predetermined rare-earth metal and a predetermined transition metal; and said second under layer is formed of a thin film of an alloy of a predetermined rare-earth metal and a predetermined transition metal.

The $23^{rd}$ aspect of the present invention is the magneto-optical recording medium according to the $22^{nd}$ aspect of the present invention, wherein the rare-earth metal is at least one of Tb, Gd, Dy and Ho.

The $24^{th}$ aspect of the present invention is the magneto-optical recording medium according to the $1^{st}$ aspect of the present invention, wherein said recording layer has a multilayer structure.

The $25^{th}$ aspect of the present invention is the magneto-optical recording medium according to the $1^{st}$ aspect of the, present invention, wherein said first under layer is a non-magnetic thin film.

The $26^{th}$ aspect of the present invention is the magneto-optical recording medium according to the $2^{nd}$ aspect of the present invention, wherein said second under layer is a non-magnetic thin film.

The $27^{th}$ aspect of the present invention is the magneto-optical recording medium according to the $25^{th}$ or the $26^{th}$ aspects of the present invention, wherein said non-magnetic thin film contains at least one of Al, Ti, Ta, Cr, Cu, Ag, Au, Pt, Nb, Si and Ru.

The $28^{th}$ aspect of the present invention is the magneto-optical recording medium according to the $1^{st}$ aspect of the present invention, wherein the surface roughness Ra of said first under layer is substantially within the range from 0.1 to 1.5 nm.

The $29^{th}$ aspect of the present invention is magneto-optical recording medium according to the $2^{nd}$ aspect of the present invention, wherein the surface roughness Ra of said second under layer is substantially within the range from 0.2 to 2 nm.

The $30^{th}$ aspect of the present invention is the magneto-optical recording medium according to the $9^{th}$ aspect of the present invention, wherein said inert gas contains at least one of Ar, Ne, Kr and Xe.

The $31^{st}$ aspect of the present invention is the magneto-optical recording medium according to the $1^{st}$ aspect of the present invention, wherein said recording layer takes in substantially 0.5 mol % or more inert gas.

The $32^{nd}$ aspect of the present invention is the magneto-optical recording medium according to the $31^{st}$ aspect of the present invention, wherein said inert gas contains at least one of Ar, Ne, Kr and Xe.

The $33^{rd}$ aspect of the present invention is a method of manufacturing a magneto-optical recording medium including a recording layer having a plurality of columns extending in a lamination direction, and a first under layer which is placed below the recording layer and which functions as a nucleus for the columns, said method comprising:

a first under layer forming step of forming the first under layer; and a recording layer forming step of forming the recording layer on the first under layer formed in said first under layer forming step.

The $34^{th}$ aspect of the present invention is the method of manufacturing a magneto-optical recording medium according to the $33^{rd}$ aspect of the present invention, said magneto-optical recording medium further having a second under layer which is placed between the recording layer and the first under layer and through which the width of the columns is controlled, said method further comprising a second under layer forming step of forming the second under layer on the first under layer formed, the recording layer being formed on the second under layer formed.

The $35^{th}$ aspect of the present invention is the method of manufacturing a magneto-optical recording medium according to the $34^{th}$ aspect of the present invention, wherein the pressure at the time of film forming in said first under layer forming step is lower than the pressure at the time of film forming in said second under layer forming step.

The $36^{th}$ aspect of the present invention is the method according to the $35^{th}$ aspect of the present invention, wherein the pressure at the time of film forming is substantially equal to or higher than 1.5 Pa and lower than 6 Pa.

The $37^{th}$ aspect of the present invention is the method according to the $34^{th}$ aspect of the present invention, wherein the pressure at the time of film forming in said second under layer forming step is lower than the pressure at the time of film forming in said recording layer forming step.

The $38^{th}$ aspect of the present invention is the method according to the $34^{th}$ aspect of the present invention, wherein the deposition rate at the time of film forming in said first under layer forming step is lower than the deposition rate at the time of film forming in said second under layer forming step.

The $39^{th}$ aspect of the present invention is the method according to the $34^{th}$ aspect of the present invention, wherein the deposition rate at the time of film forming in said second under layer forming step is lower than the deposition rate at the time of film forming in said recording layer forming step.

The $40^{th}$ aspect of the present invention is the method according to the $33^{rd}$ aspect of the present invention, wherein the deposition rate at the time of film forming in said first under layer forming step is substantially within the range from 0.2 to 5 nm/sec.

The $41^{st}$ aspect of the present invention is the method according to the $34^{th}$ aspect of the present invention, wherein the deposition rate at the time of film forming in said second under layer forming step is substantially within the range from 0.2 to 5 nm/sec.

The $42^{nd}$ aspect of the present invention is the method according to the $33^{rd}$ aspect of the present invention, wherein the deposition rate at the time of film forming in said recording layer forming step is substantially within the range from 2 to 20 nm/sec.

The $43^{rd}$ aspect of the present invention is a method of recording on a magneto-optical recording medium including a recording layer having a plurality of columns, and a first under layer which is placed below the recording layer and which functions as a nucleus for the columns, wherein the plurality of columns extends in a direction perpendicular to the layers, said method comprising a data write step of writing predetermined data to the recording layer.

The $44^{th}$ aspect of the present invention is a method of reproduction from a magneto-optical recording medium including a recording layer having a plurality of columns, and a first under layer which is placed below the recording layer and which functions as a nucleus for the columns, wherein the plurality of columns extends in a direction perpendicular to the layers, said method comprising a data readout step of reading out predetermined data written to the recording layer.

Figure 1:
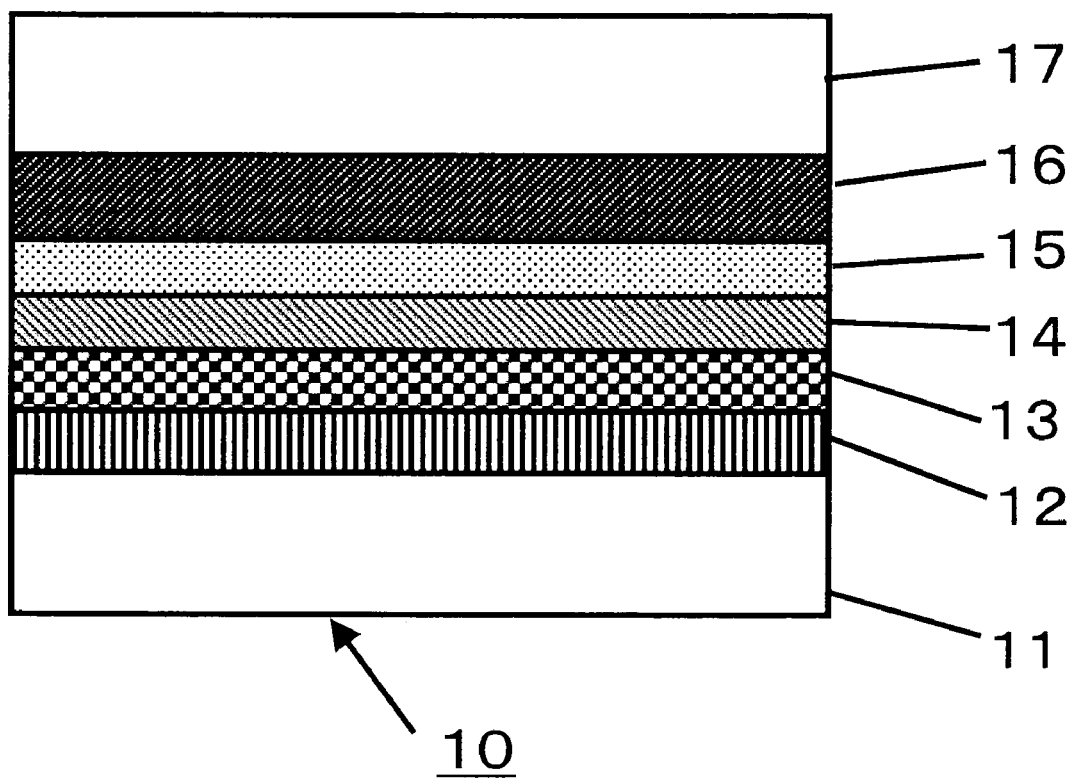
FIG. 1 is a cross-sectional view of the structure of a magneto-optical recording medium in Embodiment 1 of the present invention.

DESCRIPTION OF SYMBOLS 10, 20 30 Magneto-optical recording medium
11, 21, 31 Optical disk substrate
12, 22, 32 Dielectric layer
13, 23, 37 Reproduction layer
14, 25, 36 Intermediate switching layer
15, 26, 35 Recording layer
16, 27, 38 Second dielectric layer
17, 28 Overcoat layer
24 Control layer
19 Reproducing beam spot of a laser beam
29a First under layer
29b Second under layer
33 Seed layer
34 Grain growth layer

PREFERRED EMBODIMENTS OF THE INVENTION

Preferred embodiments of the present invention will be described with reference to the accompanying drawings.

Embodiment 1

A magneto-optical recording medium in Embodiment 1 of the present invention will be described.

FIG. 1 is a cross-sectional view of the structure of a magneto-optical recording medium (hereinafter referred to as "magneto-optical disk") 10 in Embodiment 1 of the present invention.

In FIG. 1, a transparent optical disk substrate made of polycarbonate is indicated by reference numeral 11 and a dielectric layer for protection of a recording film and for adjusting the optical characteristics of the medium is indicated by 12.

The recording film formed as a multilayer film is constituted by a reproduction layer 13 for detecting information by displacing domain walls, an intermediate layer (intermediate switching layer) 14 for controlling exchange coupling between the reproduction layer 13 and a recording layer 15, and the recording layer 15 in which information is held.

Further, a second dielectric layer 16 for protection of the recording film and an overcoat layer 17 are provided.

The reproduction layer 13 corresponds to the first under layer of the present invention, the intermediate layer 14 corresponds to the second under layer of the present invention, and the recording layer 15 corresponds to the recording layer of the present invention.

In the magneto-optical recording medium 10 of Embodiment 1 of the present invention shown in FIG. 1, domain walls which come near to a reproduction light beam are successively displaced and the displacement of each domain wall is detected. A domain wall displacement detection (DWDD) method in which ultraresolution reproduction exceeding a detection limit determined by the wavelength of reproduction light and the numerical aperture of the objective lens can be applied to recording on this magneto-optical recording medium.

A multilayer recording film formed as described above corresponds to an example of the DWDD method in which the amplitude of a reproduction signal is increased by utilizing displacements of domain walls.

It is essential to enable use of the DWDD method, for example by forming a magnetic layer having a large interfacial saturated coercive force as a recording layer, forming a magnetic film having a small interfacial saturated coercive force as a reproduction layer in which domain walls are displaced, and using a magnetic film having a comparative low Curie temperature as an intermediate layer for switching, as described in the above-mentioned Japanese Patent Laid-Open No. 6-290496. Accordingly, the present invention is not limited to the above-described film structure.

Figure 9:
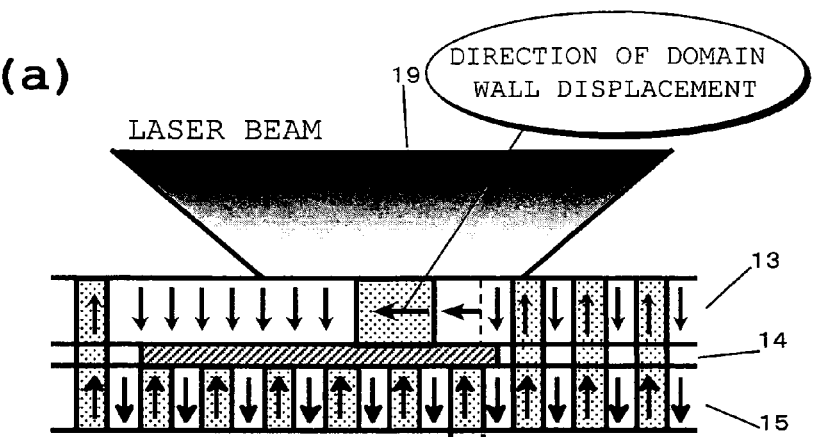
FIG. 9(a) is a cross-sectional view of the structure (particularly along the direction of magnetization) of the recording film of the magneto-optical recording medium in Embodiment 1 of the present invention.
FIG. 9(b) is a characteristic diagram showing a temperature distribution in the magneto-optical recording medium in Embodiment 1 of the present invention with respect to the position of the medium during reproducing operation.
FIG. 9(c) is a characteristic diagram showing the magnetic domain wall energy density in the reproduction layer in Embodiment 1 of the present invention.
FIG. 9(d) is a characteristic diagram showing a force which acts to move magnetic domain walls in the reproduction layer in Embodiment 1 of the present invention.
Figure 9:
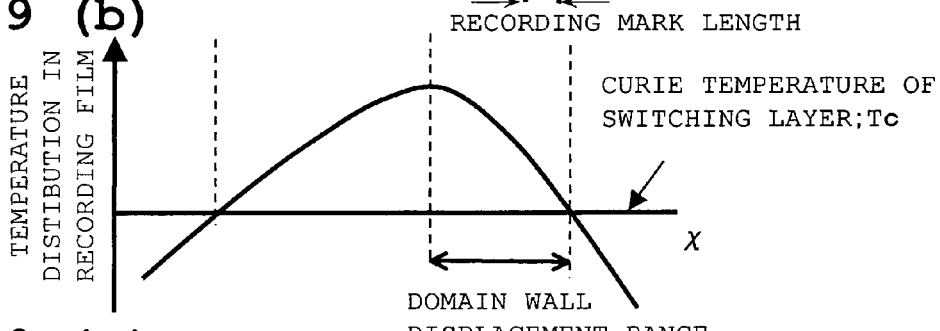
Figure 9:
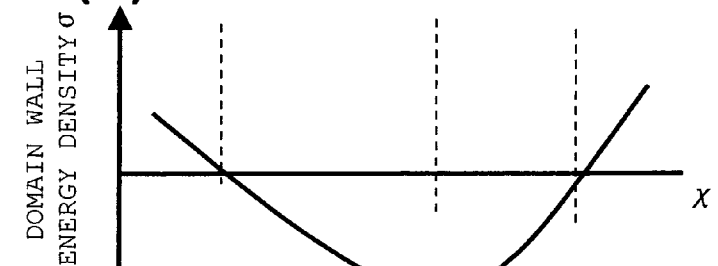
Figure 9:
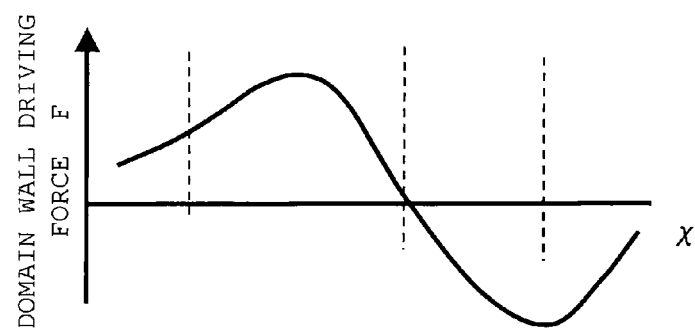

The principle of reproduction in the above-described DWDD method will be described with reference to FIGS. 9A to 9D. FIG. 9(a) is a schematic cross-sectional view of a recording layer on a rotating disk. A recording film constituted by three layers: reproduction layer 13, intermediate layer 14 and recording layer 15 is formed on an optical disk substrate and a dielectric layer (not shown). Another dielectric layer (not shown) is formed on these layers and an overcoat layer (not shown) which is a protective coat formed of an ultrasonic curing resin is also formed.

A magnetic film material having a small domain wall coercive force is used as the reproduction layer 13. A magnetic film having a low Curie temperature is used as the intermediate layer 14. A magnetic film capable of holding even recording magnetic domains of a small domain diameter is used as the recording layer 15.

In the reproduction layers of conventional magneto-optical recording mediums, a magnetic domain structure including domain walls not closed is formed by forming a guard band or the like.

As shown in the figure, an information signal is formed on the recording layer 15 as recording magnetic domains by thermomagnetic recording. In the recording film at room temperature not irradiated with a laser light spot, the recording layer 15, the intermediate layer 14 and the reproduction layer 13 are strongly exchange-coupled to each other and, therefore, recording magnetic domains in the recording layer 15 are directly transferred into and formed in the reproduction layer 13.

FIG. 9(b) shows the relationship between a position x corresponding to the cross sectional view in FIG. 9(a) and the temperature T of the recording film. As shown in the figure, the disk rotates at the time of reproduction of a recorded signal and is irradiated with a reproducing beam spot of a laser beam along a track. At this time, in the recording film, a temperature distribution such as shown in FIG. 9(b) is exhibited, a temperature region Ts where the temperature of the intermediate layer is equal to or higher than the Curie temperature Tc exists, and exchange coupling between the reproduction layer 13 and the recording layer 15 is interrupted.

Also, when the reproduction beam is applied, a gradient of the domain wall energy density σ, shown in a dependence on the domain wall energy density σ in FIG. 9(c), exists in the x direction of disk rotation at a position shown in FIGS. 9A and 9B. Therefore, a force F which drives the domain wall in each layer at the position x acts on the domain wall, as shown in FIG. 9(d).

The force F acting in the recording film is increased if the gradient of the domain wall energy density σ is increased, and acts so as to displace each domain wall in a direction in which the domain wall energy density σ is lower, as shown in FIGS. 9A to 9D. In the reproduction layer 13, the domain wall coercive force is small and the domain wall mobility is high. Therefore, in a case where only the reproduction layer 13 having domain walls not closed exists, each domain wall is easily displaced by this force F. Thus, each domain wall in the reproduction layer 13 is displaced instantaneously to a region where the temperature is high and the domain wall energy density is low, as indicated by the arrow. When the domain wall passes in the reproducing beam spot, the reproduction layer 13 is uniformly magnetized in a wide region of the light spot.

Consequently, the reproduction signal amplitude is always at the maximum independently of the size of recording magnetic domains.

In the conventional DWDD method, a magnetic domain structure including domain walls not closed is formed and each domain wall in the reproduction layer 13 in which exchange coupling between tracks is interrupted is displaced. Therefore it is necessary that even microscopic domains be recorded with stability. However, there has been a possibility of fluctuation of a reproduction signal depending on the shape of recording magnetic domains and transfer into the reproduction layer 13. According to the present invention, such fluctuations of a reproduction signal can be limited.

A method of manufacturing the magneto-optical disk 10 of Embodiment 1 of the present invention will now be described in detail. A method of recording on the magneto-optical recording medium in accordance with the present invention and a method of reproduction from the magneto-optical recording medium in accordance with the present invention will be simultaneously described (corresponding methods will also be described with respect to Embodiments 2 and 3).

As shown in FIG. 1, the recording film having the above-described magnetic films in a multilayer structure is formed on the optical disk substrate 11. Land portions are formed on opposite sides of a groove in the optical disk substrate 11. The depth h of the groove in a rectangular form is 60 nm from the upper surface of the land portions. In the magneto-optical disk 10 of Embodiment 1, the track pitch is substantially 0.7 μm and the groove width is substantially 0.55 μm.

A ZiS.SiO$_2$ target is mounted in a magnetron sputtering apparatus and a transparent optical disk substrate 11 formed of polycarbonate and having a groove formed therein is fixed on a substrate holder. Thereafter, the interior of the chamber is evacuated to a high vacuum of substantially $5 \times 10^{-6}$ Pa or less by a cryopump. In the evacuated state, Ar gas is introduced into the chamber until substantially 0.5 Pa is reached. Film of ZiS.SiO$_2$ is formed as the dielectric layer 12 to a thickness of substantially 75 nm by radiofrequency sputtering while the substrate is being rotated.

Subsequently, also in the evacuated state, Ar gas is introduced into the chamber until 0.5 Pa is reached and reproduction layer 13 is formed to a thickness of 30 nm by DC magnetron sputtering using a GdFeCoAl target while the substrate is being rotated. Then, Ar gas is introduced into the chamber until 1.8 Pa is reached and a TbDyFeCoAl layer is formed as the intermediate layer 14 to a thickness of 15 nm by using Tb, Dy, Ho, Fe, Co, and Al targets. Further, Ar gas is introduced into the chamber until 2.0 Pa is reached and, by DC magnetron sputtering using the same target configuration, film of TbHoFeCo is formed as the recording layer 15 to a thickness of 60 nm. The film composition of each layer can be adjusted to the desired film composition by controlling the input power ratio with respect to each target.

Further, Ar gas is introduced into the chamber until 0.6 Pa is reached and film of ZiS.SiO$_2$ is formed as the second dielectric layer 16 to a thickness of 90 nm by radiofrequency sputtering while the substrate is being rotated.

Further, the overcoat layer 17 is formed in such a manner that an epoxy acrylate resin is put dropwise on the dielectric layer 16 and applied over the same by spin coating to a film thickness of 6 μm, and is cured by being irradiated with ultraviolet rays from an ultraviolet lamp.

The compensation composition temperature of the reproduction layer 13 formed of GdFeCoAl is 180° C. and the Curie temperature of this layer is 270° C. The Curie temperature of the intermediate layer 14 formed of TbDyFeCoAl is 155° C., and the rare-earth metal component is predominant in the intermediate layer 14 at any temperature below the Curie temperature.

The compensation composition temperature of the recording layer 15 formed of TbHoFeCo is 90° C. The recording layer 15 is formed by controlling the composition by setting the input power with respect to each target so that the Curie temperature of this layer is 295° C.

The reproduction layer 13 formed of GdFeCoAl can be formed in an amorphous film structure having a microscopic structural unit of 0.8 nm or less by controlling the film forming rate and the rotational speed of the optical disk substrate at the time of film forming, and can function as a under layer which is a nucleus for forming a columnar structure of the recording layer.

The columnar structure of the recording layer can be said to be a porous film structure in which gaps are formed between columns. Such a columnar structure is also described in the specification of Japanese Patent Application No.2001-365047 and WO03/046905 (PCT).

The entire disclosures in Japanese Patent Application No.2001-365047 and WO03/046905 (PCT) are incorporated herein by reference.

That is, the columnar structure of the recording layer is said to be a structure having a characteristic distribution such as a film structure distribution or a density distribution among columns. In particular, with respect to a columnar structure which is a porous film structure, a structure is conceivable in which regions of an extremely low density or gaps are formed among columns.

The intermediate layer 14 is formed on the reproduction layer 13 as a film structure in which an 8 nm columnar structure is formed, and functions as a second under layer capable of controlling the column width in the recording layer 15.

Concrete film forming conditions are as described below.

The reproduction layer 13 formed of GdFeCoAl is formed at a film forming rate of 3 nm/sec while rotating and revolving at 100 rpm. The intermediate layer 14 formed of TbDyFeCoAl is formed at a film forming rate of 5 nm/sec while rotating and revolving at 40 rpm.

As the recording layer 15 formed of TbHoFeCo, a magnetic thin film of a columnar structure having a structural unit width of 15 nm can be formed at a film forming rate of 8 nm/sec while rotating and revolving at 40 rpm.

Figure 2:
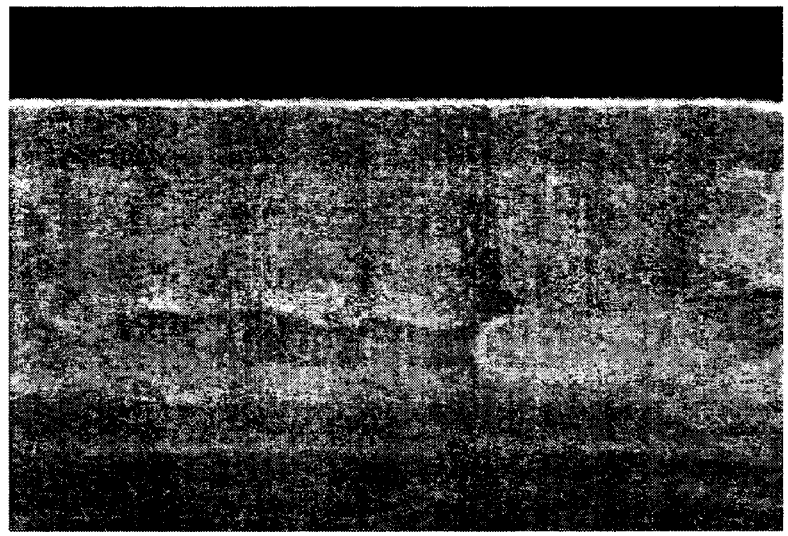
FIG. 2(a) is a photographic image showing a result of SEM observation of a cross section of the magneto-optical recording medium in Embodiment 1 of the present invention.
FIG. 2(b) is a photographic image showing a result of SEM observation of a cross section of a conventional magneto-optical recording.
Figure 2:
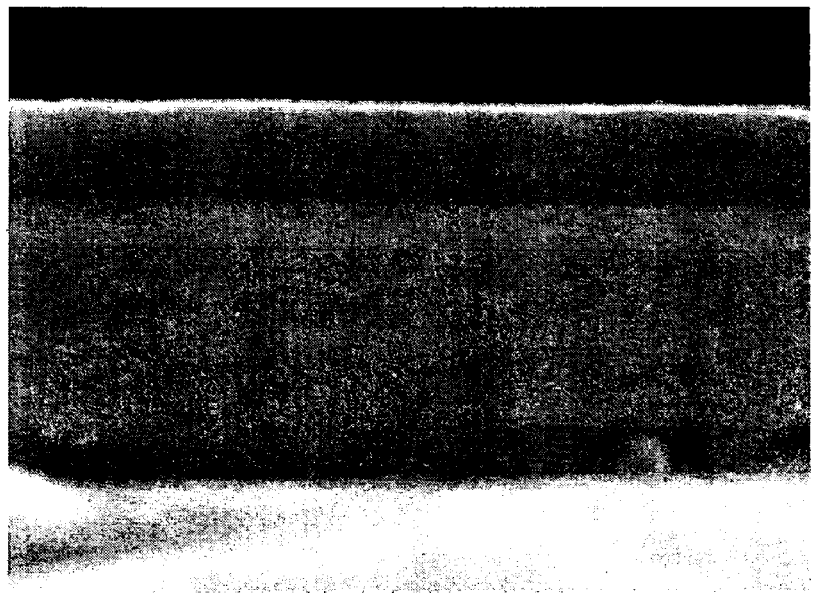

FIG. 2(a) shows a photograph of a cross section of the magneto-optical disk actually observed through a scanning electron microscope (SEM). As shown in FIG. 2(a), the recording layer 15 formed of TbHoFeCo and made by the above-described arrangement can be observed in a state of being formed as a magnetic thin film having a columnar structure or a column configuration in which columns extend in a direction perpendicular to the film surface.

In contract, in a film structure such as shown in FIG. 2(b), in which the reproduction layer or the intermediate layer does not function as a nucleus for forming a columnar structure, the recording layer can be recognized in a state of being formed as an amorphous thin film of a microscopic structure such that substantially no microscopic structural unit can be observed.

Figure 3:
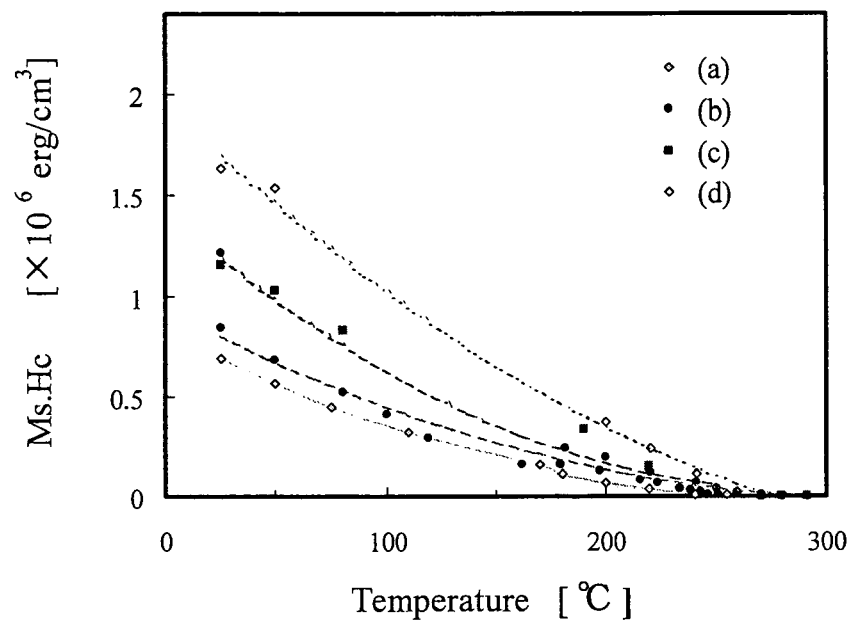
FIG. 3 is a characteristic diagram showing a temperature dependence of MsHc of the magneto-optical recording medium in Embodiment 1 of the present invention.

FIG. 3 shows a temperature dependence of the product Ms·Hc of the saturated magnetic field Ms and the coercive force Hc of the recording layer 15 of the magneto-optical recording medium in Embodiment 1 of the present invention. As shown in FIG. 3, the product Ms·Hc indicated by the uppermost curve in the graph corresponding to the magneto-optical disk of Embodiment 1 (see FIG. 2(a)) is roughly twice the product Ms·Hc indicated by the lowermost curve in the graph corresponding to the example of the conventional art (see FIG. 2(b)). At room temperature, a value of $1.8 \times 10^6$ erg/cm$^2$ or greater can be obtained as the product Ms.Hc in the case of Embodiment 1.

The recording layer is formed in a column configuration as described above to increase Ms.Hc of the recording film and to stabilize recording magnetic domains. Therefore, the recording medium of Embodiment 1 is capable of stable signal recording/reproduction even in the case of repeated rewriting.

The optical disk substrate 11 of the magneto-optical disk 10 formed as described above has a rectangular land-groove configuration. However, even in the case of an arrangement in which magnetic separate is effected by using land portions formed as a lower land between grooves in which information is recorded or in the case of a method of performing annealing on portions between recording tracks, reproduction by the above-described DWDD method can be performed if the domain walls of recording magnetic domains transferred into the reproduction layer can be easily displaced.

In Embodiment 1, the arrangement is more advantageous if the track pitch is substantially 1.0 μm or less; land portions are formed in such a configuration as to have a width substantially in the range from 0.2 to 0.8 μm between grooves in which information is recorded; and recording magnetic domains are formed such that the shortest mark length of recorded information is substantially 200 nm or less.

The recording layer of the magneto-optical recording medium of Embodiment 1 is not limited to the above-described arrangement.

A different arrangement capable of obtaining similar reproduction characteristics is possible if a recording layer having a column configuration having a structural unit of a width substantially within the range from 1 to 40 nm (more preferably, within the range from 2 to 15 nm) is formed on a under layer which functions as a nucleus for forming a columnar structure, and if the film thickness of the recording layer is not smaller than substantially 50 nm (more preferably, in the range from 60 to 200 nm).

The magneto-optical recording medium of Embodiment 1 has been described with respect to a recording layer formed by growing a recording layer columnar structure in such a manner that an under seed layer which functions as a nucleus for forming the columnar structure is used as a reproduction layer, and a grain growth layer for controlling the column width is used as an intermediate layer.

The under seed layer and the grain growth layer can be formed by using magnetic films of the same composition as the reproduction layer, intermediate layer and control layer in the recording film of a magneto-optical recording medium for magnetic superresolution recording to simultaneously achieve the different functions.

This method makes it possible to obtain high-density equivalent or higher recording/reproduction characteristics without increasing the number of layers of the recording film.

Also, the under seed layer not having a microscopic structural unit is used as the reproduction layer to make possible a magneto-optical recording medium also improved in DWDD characteristics.

Figure 4:
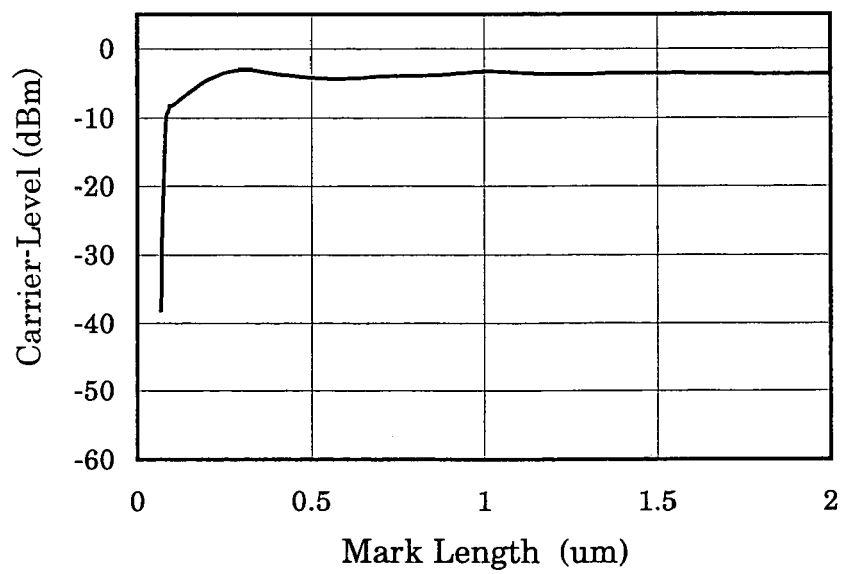
FIG. 4 is a characteristic diagram showing a dependence of the carrier level of the magneto-optical recording medium in Embodiment 1 of the present invention on the mark length.

FIG. 4 is a characteristic diagram showing a dependence of the carrier level on the mark length in the magneto-optical recording medium having the recording layer 15 in which a columnar structure is formed along a direction perpendicular to the film surface by using the above-described under layer of Embodiment 1 in a case where a recording film having a film structure according to the DWDD method is used.

In Embodiment 1, the film structure of the recording layer 15 has a column configuration and the stability of microscopic magnetic domains therein is improved. Therefore, even a recording magnetic domain of a mark length of substantially 100 nm can be stably transferred into the reproduction layer 13 and the domain wall of the transferred magnetic domain can be displaced.

Indeed, with respect to the case of using an optical disk substrate having substantially a track pitch of 0.7 μm and a groove width of 0.55 μm, as illustrated, it can be understood that a magneto-optical disk in which substantially no change is caused in the carrier level if the mark length of substantially 100 nm is not exceeded, can be realized by effecting separation of magnetization of the recording film between grooves by land portions.

In Embodiment 1, magnetization of the recording film is separated between grooves by land portions to enable information to be recorded in the reproduction layer 13 in the grooves containing domain walls not closed.

Even in the case of an arrangement in which information is recorded at land portions or an arrangement in which information is recorded at lands and at grooves, similar characteristics can be obtained.

As described above, the arrangement of Embodiment 1 makes it possible to obtain stable reproduction signal characteristics even in the case of high-density recording/reproduction based on the DWDD method.

In the case of recording at grooves in Embodiment 1, the groove width and depth influence the recording/reproduction characteristics in the DWDD method.

However, the same effects can be achieved with respect to magneto-optical recording mediums of a configuration in which the relationship between the height and width of land portions is such that the track pitch is substantially within the range from 0.4 to 1.0 μm, the groove width is substantially within the range from 0.2 to 0.8 μm, and the groove depth is substantially within the range from 20 to 200 nm, and in which the recording layer is formed by adjusting the seed layer and the grain growth layer according to the groove configuration.

In a case where the height of land portions between grooves in which information is recorded is small, substantially $\lambda/20n$ to $\lambda/3n$ (n: a refractive index, the same symbol used below), the optical disk substrate can be easily formed and noise from grooves can be reduced.

In the arrangement of Embodiment 1, as described above, microscopic magnetic domains of substantially 200 nm or less are formed with stability in a recording film having a columnar structure capable of rewriting recorded information, thereby ensuring the desired domain wall mobility.

The reproduction signal can be increased by displacement of transferred magnetic domains according to the DWDD method.

Further, since information recording/reproduction in the recording/reproduction track can be performed with stability, crosswrite or crosstalk between each adjacent pair of tracks at the time of recording or reproduction can be prevented.

Embodiment 2

Figure 5:
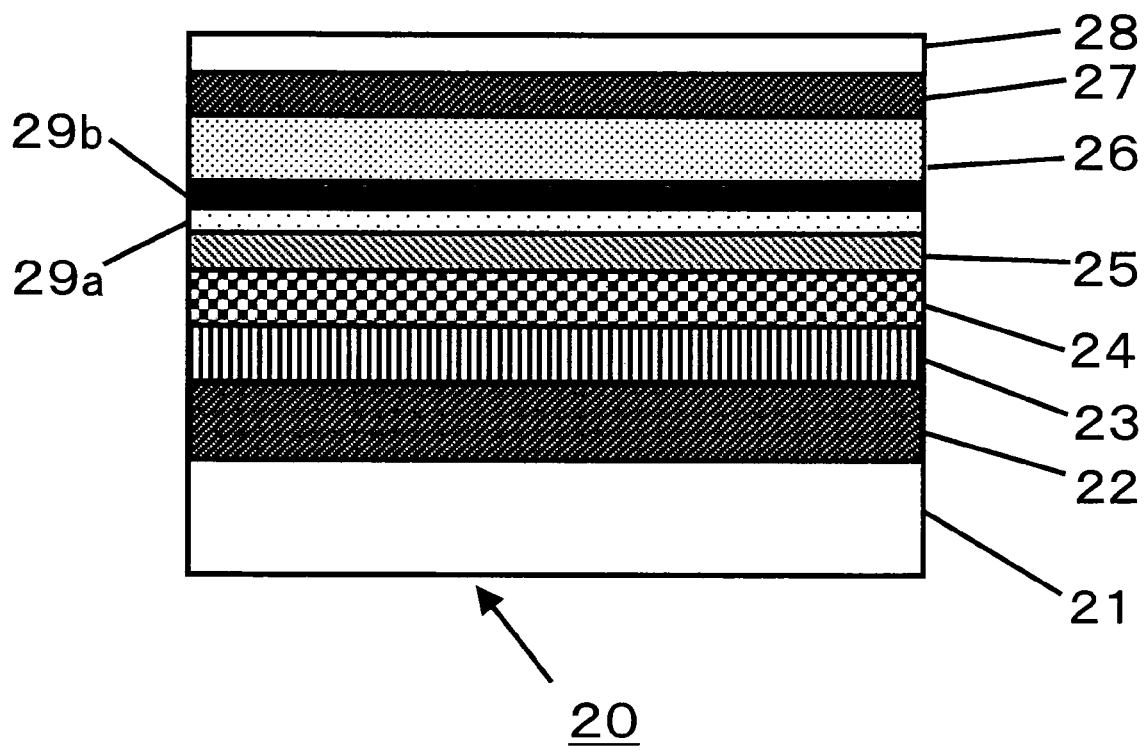
FIG. 5 is a cross-sectional view of the structure of a magneto-optical recording medium in Embodiment 2 of the present invention.

FIG. 5 is a cross-sectional view of the structure of a magneto-optical disk 20 in Embodiment 2 of the present invention.

An optical disk substrate formed of olefin is indicated by 21.

Tracks for recording information arranged in a widthwise direction are formed in a groove configuration, and inverted V-shaped land portions are formed at the boundaries between the tracks.

An example of a format method in accordance with the present invention will be described.

In Embodiment 2, groove regions where rewrite of recorded information is possible and pit regions where wobble pits for a servo and address pits are formed are alternately formed in parallel with each other on the tracks.

This format configuration enables a process in which information is recorded in rewritable regions by detecting addresses while operating a tracking servo in a sample servo system or the like, or information is reproduced from the rewritable regions.

Assuming the laser wavelength is λ, if the height of land portions between grooves in which information is recorded may be substantially within the range from λ/20n to λ/3n, or λ may be substantially within the range from 20 nm to 180 nm, the optical disk substrate can be easily formed and noise from grooves can be reduced.

This arrangement ensures that prepits such as address pits can be detected, and that recording/reproduction based on the DWDD method effecting magnetic separate between tracks can be realized in groove recording.

The magneto-optical disk 20 of Embodiment 2 has a transparent optical disk substrate 21 formed of polyolefin, a dielectric layer 22 for protection of a recording film and for adjusting the optical characteristics of the medium, a reproduction layer 23 for detecting information by displacing magnetic domain walls, a control layer 24 for reducing a ghost signal, an intermediate switching layer 25 for controlling exchange coupling between the reproduction layer and a recording layer, a recording layer 26 in which information is held, a second dielectric layer 27 for protection of the recording film, and an overcoat layer 28 on the second dielectric layer 27.

The recording film in a multilayer structure is constituted by four layers: reproduction layer 23, control layer 24, intermediate switching layer 25 and recording layer 26.

In the magneto-optical recording medium of Embodiment 2 thus arranged, domain walls which come near to a reproduction light beam are successively displaced as in Embodiment 1 and the displacement of each domain wall is detected, thus enabling ultraresolution image reproduction exceeding a detection limit determined by the wavelength of reproduction light and the numerical aperture of the objective lens.

On the optical disk substrate 21 of the magneto-optical disk 20 of Embodiment 2, lands are formed at the boundaries between grooves in which information is recorded. The groove depth h is 45 nm from the upper surface of the lands. The grooves in each adjacent pair of tracks are magnetically separated from each other by the land.

In the magneto-optical disk 20 of Embodiment 2, the track pitch is 0.55 μm and the groove width is 0.4 μm.

In the magneto-optical disk 20 constructed as shown in FIG. 5, thin films for a magneto-optical recording medium are formed by a film forming apparatus.

In the film forming apparatus, a thin film is formed on the optical disk substrate 21 held on a substrate holder placed in a position such as to face alloy targets for the recording film in a vacuum chamber while the substrate holder is being rotated.

After this film forming, the substrate is moved to another vacuum chamber together with the substrate holder by a vacuum transport mechanism and a recording film of a different material or differing in composition is further formed.

A magnet is placed at the rear side of the target, and electric power is supplied to the cathode from a direct-current power supply. Thus, the recording film and dielectric films are formed by magnetron sputtering.

In the process of making the recording film, a B-doped Si target is first set in a direct-current magnetron sputtering apparatus. The transparent optical disk substrate 21 formed of polyolefin and having grooves formed therein is then fixed on the substrate holder. Thereafter, the interior of the chamber is evacuated by a turbomolecular pump to obtain a high vacuum of $6 \times 10^{-6}$ Pa or less.

In the evacuated state, Ar gas and $N_2$ gas are introduced into the chamber until 0.3 Pa is reached. A film of SiN is formed as the dielectric layer 22 to a thickness of 40 nm by reactive sputtering while the substrate is being rotated.

Subsequently, also in the evacuated state, Ar gas is introduced into the chamber until 0.6 Pa is reached. Films each having a thickness of 10 nm are successively formed on the dielectric layer 22 as the reproduction layer 23 formed of GdFeCoCr by using three alloy targets formed of different compositions Gd26Fe60Co11Cr3, Gd24Fe59Co9Cr8, and Gd23Fe57Co7Cr13 (content: mol %) while the substrate is being rotated.

Next, a 10 nm thick TbFeCoCr film for the control layer 24, a 15 nm thick TbDyFeCr film for the intermediate layer 25 and a 100 nm thick TbFeCoCr film for the recording layer 26 are successively formed by DC magnetron sputtering method.

Further, Ar gas and $N_2$ gas are introduced into the chamber until 0.3 Pa is reached and a 70 nm thick film of SiN is formed as the second dielectric layer 27 by reactive sputtering while the substrate is being rotated.

Further, the overcoat layer 28 formed of an epoxy acrylate resin is applied on the second dielectric layer 27 by spin coating and is cured by being irradiated with ultraviolet rays.

The reproduction layer 23 in Embodiment 2 is constituted by the three magnetic films differing in composition.

More specifically, the reproduction layer 23 is constituted by three layers differing in composition: a layer having a compensation composition temperature of 170° C. and a Curie temperature of 250° C., a layer having a compensation composition temperature of 140° C. and a Curie temperature of 210° C., and a layer having a compensation composition temperature of 110° C. and a Curie temperature of 170° C.

By forming this structure, the desired mobility of magnetic domain walls can be ensured with respect to a temperature distribution formed by the reproducing light beam and smooth domain enlargement reproduction of a reproduction signal can be realized.

The Curie temperature of the control layer 24 formed of TbFeCoCr is 160° C., and the rare-earth metal component is predominant in the control layer 24 at any temperature below the Curie temperature.

The Curie temperature of the intermediate layer 25 formed of TbFeCr is 145° C., and the transition metal component is predominant in the intermediate layer 25 at any temperature below the Curie temperature.

Specifically, the reproduction layer 23 in the three-layer structure formed of GdFeCoCr can be formed in an amorphous film structure having a microscopic grain structure unit of substantially 1.0 nm or less by deposition lamination by setting a substrate rotational speed of 300 rpm, a film forming Ar pressure of 0.5 Pa and a film forming rate of 10 nm/sec.

Each of the control layer 24 formed of TbFeCoCr having thickness of 10 nm and the intermediate layer 25 formed of TbDyFeCr film having thickness of 15 nm can be formed as an amorphous magnetic thin film having a structural unit of substantially 2.0 nm or less by setting a substrate rotational speed of 100 rpm, a film forming Ar pressure of 3.0 Pa and a film forming rate of 5 nm/sec.

The compensation composition temperature of the recording layer 26 formed of TbFeCoCr is 100° C., and the composition in the recording layer 26 is controlled so that the Curie temperature is 260° C.

In the film structure of the recording layer, the Ar gas pressure during film forming, the film forming rate and the rotational speed of the optical disk substrate held on the substrate holder are controlled to form the first under layer 29a as a nucleus for changing the structure of the magnetic thin film.

More specifically, a first portion of the recording film having a thickness of 15 nm is formed by setting a substrate rotational speed of 80 rpm, a film forming Ar gas pressure of 0.4 Pa and a film forming rate of 1 nm/sec to form the under layer as a nucleus for the recording layer.

In this case, the structural unit of the first under layer is small and the film structure is formed as an amorphous structure which is random on the order of atoms or as a structure having a structural unit substantially smaller than 2 nm.

Another portion having thickness of 15 nm is deposited by setting an Ar gas pressure of 2.5 Pa and a film forming rate of 3 nm/sec to form the second under layer 29b capable of controlling the grain width in the recording layer.

The other portion of the recording film having a thickness of 70 nm is formed by setting a film forming Kr gas pressure of 4.5 Pa and a film forming rate of 10 nm/sec to form the recording film, which is a magnetic thin film in a columnar structure formed of columns having a structural unit width of 20 nm.

A first under layer 29a corresponds to the first under layer of the present invention, and a second under layer 29b corresponds to the second under layer of the present invention, and the recording layer 26 corresponds to the recording layer of the present invention.

Through SEM observation of across section of the recording layer at a high resolution, a state can be observed in which the magnetic thin film has a columnar structure or a column configuration in which columns extend in a direction perpendicular to the film surface, as in Embodiment 1.

The column width in the columnar structure of the recording layer can be controlled by controlling the gas pressure and the film forming rate during film forming of the second under layer.

On sloped portions between grooves adjacent to each other, the columnar structure of the recording layer is inclined from the direction perpendicular to the film surface to effect magnetic separate between the information track grooves.

Thus, as in Embodiment 2, the groove is used as a rewrite region at the time of recording/reproduction based on the DWDD method, and magnetic separate is effected on at least a portion of the recording film between each adjacent pair of grooves.

Therefore, the domain walls of magnetic domains transferred from the recording layer 26 into the reproduction layer 23 are displaced with stability and a signal having an increased signal amplitude can be reproduced even if the mark length is short.

The magneto-optical recording medium in Embodiment 2 has a columnar structure, as does that in Embodiment 1.

However, the described columnar structure is not exclusively used. An arrangement in which the recording layer has a structural unit having a width in the range from substantially 2 to 40 nm may suffice. The thickness of the recording layer may be substantially 50 nm or more (more preferably, in the range from 60 to 200 nm).

With respect to the under layer for nucleus formation for forming a columnar structure, it is desirable that the film thickness be substantially within the range from 5 to 50 nm (more preferably, within the range from 5 to 20 nm).

Also, if the film thickness of the second under layer for controlling the column width in the columnar structure is substantially within the range from 5 to 50 nm (more preferably, within the range from 5 to 20 nm), a magneto-optical disk capable of obtaining high-density recording/reproduction characteristics can be realized.

If the second under layer has a structural unit substantially in the range from 2 to 40 nm, the column width in the recording layer can be controlled more effectively.

The recording layer is formed in a columnar structure formed of columns to ensure stable signal recording/reproduction even in the case of repeated rewriting.

The magneto-optical disk 20 constructed as described above has a land-groove configuration and is arranged to effect magnetic separate with the sloped portions between grooves in which information is recorded.

However, the present invention is not limited to this arrangement. Even in the case of a method in which magnetic separate is effected by forming a deeper land or in the case of a method of performing annealing on portions between recording tracks, the domain walls of recording magnetic domains transferred into the reproduction layer can be easily displaced and reproduction by the above-described DWDD method can be performed.

In Embodiment 2, the arrangement is more advantageous if the track pitch is substantially 1.0 μm or less; land portions are formed between grooves having a groove width in substantially the range from 0.2 to 0.8 μm; and an information signal having a mark length of substantially 300 nm or less at the minimum.

In the case of the recording/reproduction signal on the magneto-optical recording medium of Embodiment 2, recording magnetic domains are formed with stability even when the mark length is small. Also, even a recording magnetic domain having a mark length of 100 nm can be transferred into the reproduction layer 23 and the domain wall of the transferred magnetic domain can be displaced for reproduction.

In signal amplitude, therefore, jitters are limited to 13% or less by enlargement reproduction.

Even when the mark length is 100 nm, the amplitude of the reproduction signal is substantially saturated.

From this, it can be understood that a magneto-optical recording medium can be realized which has improved reproduction signal characteristics because of stable transfer from the recording layer and the DWDD operation using magnetic domain displacements in the reproduction layer.

Further, the linear velocity is 2.4 m/sec. In a case where signals are recorded and reproduced by optical pulse magnetic field modulation recording, each of the reproduction power and the recording power is within substantially a range of ±20% or more.

As can be understood from the above, improved recording/reproduction margin characteristics can be obtained such that substantially no fluctuation in reproduction jitters occurs.

Further, each of the recording layer and the under layer depends on the Ar pressure at the time of film forming.

A columnar structure having a structural unit width of substantially 5 nm or more can be formed if the first under layer provided as a nucleus for forming the columnar structure is formed by using a manufacturing method in which the pressure at the time of film forming of the first under layer is lower than that at the time of film forming of the second under layer for controlling the grain width of columns in the recording layer (more specifically, a manufacturing method in which the gas pressure in the vacuum chamber when the first under layer provided as a nucleus for the columnar structure is within substantially the range from 0.2 Pa to 3 Pa, and the gas pressure when the second under layer and the recording layer are formed is within the range from 1.5 Pa to 6 Pa).

By considering the Ar flow rate and evacuation rate at the time of film forming, the gas pressure may be set to substantially 0.3 to 1.5 Pa for the first under layer and to within substantially the range from 2.5 Pa to 4.5 Pa for the second under layer and the recording layer to achieve an equal or higher effect.

Preferably, in such a case, the Ar flow rate is maximized within a range determined by the capacity of the vacuum pump. It is preferable to introduce Ar at a rate of substantially 20 SCCM (standard cubic centimeters per minute) or higher.

Also, the effect can be further improved if the density of the magnetic thin film for the first under layer provided as a nucleus for the columnar structure is lower.

A larger amount of Ar atoms is thereby taken in between the structural units of the first under layer to make the role as a nucleus for the columnar structure more effective.

The column width in the column configuration in the recording layer can be controlled by the second under layer. Recording of a mark length of 100 nm was confirmed with respect to a case where the column width was 2 nm or more.

The shortest limit mark length in the recording layer depends on the vertical magnetic anisotropy. However, recording and reproduction to a mark length of substantially 100 nm or less can be performed if a columnar structure is formed, as in Embodiment 2, and if the product (Ms.Hc) of the magnetization and the coercive force is set to substantially $1.5 \times 10^6$ or greater and a vertical magnetic anisotropy constant Ku is set to substantially $5 \times 10^5$ erg/cm$^3$ or greater (more preferably, $1 \times 10^6$ erg/cm$^3$ or greater).

The above-described columnar structure has a density distribution in a porous film structure or in the structure of columns. In an arrangement having a columnar structural unit with stability, an amount of Ar atoms equal to or larger than 0.5 mol % is contained in the under layers.

The same effect can be obtained if the content of Ar atoms in the magnetic thin film is within the range substantially from 0.5 to 4.0 mol %.

The content of Ar can be detected with an electron probe X-ray microanalyzer (EPMA) or by a Rutherford backscattering (RBS) method or the like.

In the recording film in which the above-described columnar porous film structure is formed, the density and distribution of the under layers are increased in comparison with the recording layer.

In particular, for the purpose of forming a columnar structure having a structural unit of a size in substantially the range from 5 to 40 nm, it is desirable to form the under layers as a thin film having a density of substantially 2.0 to 5.0 g/cm$^3$ at room temperature.

An amount of Ar atoms equal to or larger than substantially 0.5 mol % is contained also in the recording layer. Further, the same effect can be obtained if Ne, Kr or Xe is contained in the under layer and in the recording layer.

It is desirable that the surface roughness Ra relating to surface irregularities of the first under layer be set within the range from 0.1 to 1.5 nm (more preferably, within substantially the range from 0.1 to 1.0 nm). The second under layer and the columnar film structure of the recording layer can be formed on the fine irregularities functioning as a nucleus.

The construction using fine surface irregularities having a roughness of substantially 1 nm or less has the effect of enabling domain walls coming nearer to the reproducing light beam to be smoothly displaced in the case of a recording and reproduction method using a domain wall displacement method such as DWDD.

Consequently, to improve the signal characteristics of the magneto-optical recording medium according to the DWDD method, the film thickness of each of the first and second under layers may be set to a value substantially in the range from 5 to 50 nm (more preferably, in the range from 5 to 20 nm) and the column width in the column configuration in the recording layer may be set to substantially a value in the range from 2 to 40 nm (more preferably, in the range from 5 to 20 nm). It can be understood that a sufficiently stable vertical magnetic anisotropy of the film surface can be obtained to enable the same high-density recording/reproduction even in the case of recording a short mark of 100 nm or less.

As can be understood from jitters in signal reproduction, the minimum of film thickness of the recording layer is within substantially the range from 100 to 180 nm.

An optimum value of the film thickness, depending on the film composition and magnetic characteristics of the recording layer, may relatively be large in the case of the recording layer having a column configuration structure, such that the formation of the columnar structure can be facilitated. The film thickness of the recording layer may be set to a value within substantially the range from 40 to 300 nm (more preferably, within the range from 80 to 200 nm) to ensure that recording magnetic domains can be formed with stability even to a short mark length by using the columnar structure and can be transferred into the reproduction layer. It can be understood that recording magnetic domains can be thereby formed even to mark length of substantially 100 nm or less.

In Embodiment 2, as described above, a magnetic film capable of reproduction using DWDD is provided and magnetic separate is effected at the boundary between a track region where recorded information can be rewritten and a track adjacent to this track region.

An arrangement using a under layer and having a columnar structure in the recording layer (more specifically, the column width in the column configuration in the recording layer is within substantially the range from 2 to 40 nm, more preferably from 5 to 20 nm) is provided to ensure the desired mobility of magnetic domain walls.

Thus, the reproduction signal can be increased by displacing transferred magnetic domains on the basis of the DWDD method without performing annealing on portions between recording tracks, even when the mark length is substantially 200 nm or less.

As described above, the arrangement of Embodiment 2 makes it possible to obtain stable recording/reproduction signal characteristics even in the case of high-density recording/reproduction based on the DWDD method.

Embodiment 3

Figure 6:
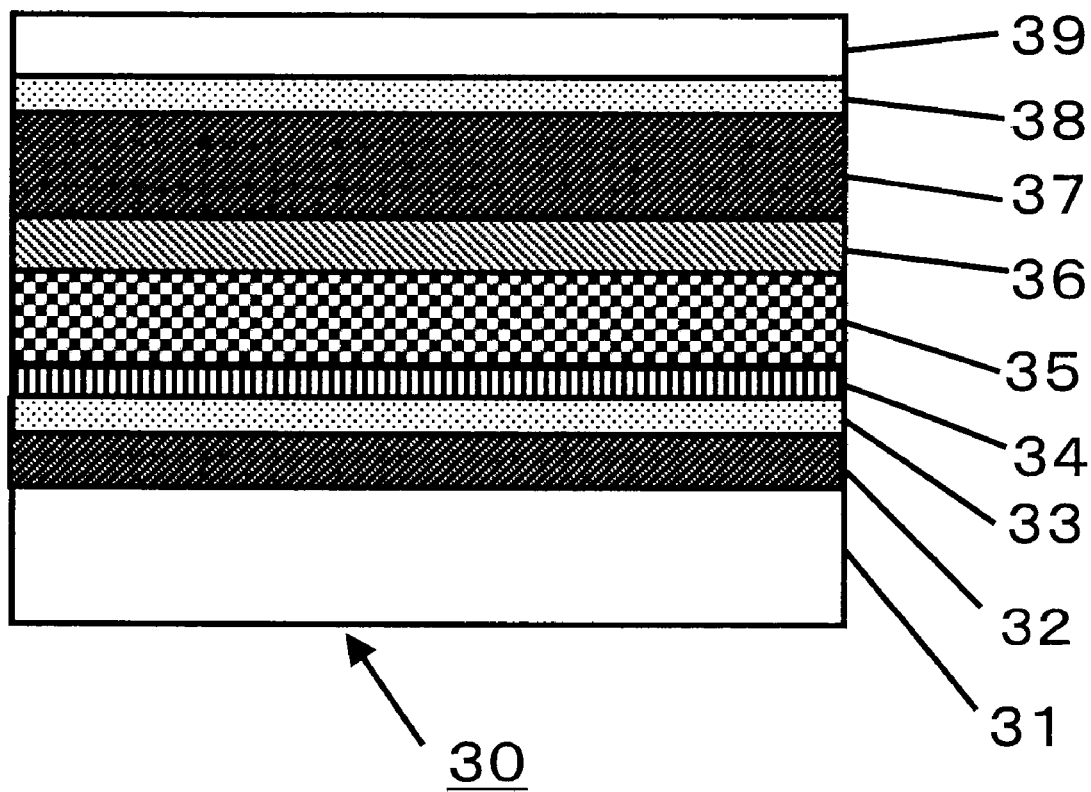
FIG. 6 is a cross-sectional view of the structure of a magneto-optical recording medium in Embodiment 3 of the present invention.

FIG. 6 is a cross-sectional view of the structure of a magneto-optical disk 30 in Embodiment 3 of the present invention.

An optical disk substrate formed of a glass substrate is indicated by 31. On the optical disk substrate 31, a spiral guide groove is formed by using a photopolymer, and inverted V-shaped lands are formed at the boundaries between recording tracks to separate the recording tracks from each other.

In the magneto-optical disk 30 of Embodiment 3, a recording film is laminated in the opposite direction in comparison with Embodiment 1 of the present invention, and information signal recording/reproduction can be performed by using a magnetic head such as a giant magnetoresistance (GMR) head.

The magneto-optical disk 30 has a transparent optical disk substrate 31 having a guide groove formed thereon and made of glass, a dielectric layer 32 for protection of the recording film, a seed layer 33 provided as a nucleus for forming a columnar film structure, a grain growth layer 34 for growing grains in grain width in the columnar film structure, a recording layer 35 in which information is held, an intermediate switching layer 36 for controlling exchange coupling between a reproduction layer and the recording layer, a reproduction layer 37 for detecting information by displacing magnetic domain walls, a dielectric layer 38 for protection of the recording film, and a lubrication film 39.

The recording film is formed in a multilayer film structure including the seed layer 33, the grain growth layer 34, the recording layer 35, the intermediate switching layer 36 and the reproduction layer 37.

The seed layer 33 corresponds to the first under layer of the present invention, and the grain growth layer 34 corresponds to the second under layer of the present invention, and the recording layer 35 corresponds to the recording layer of the present invention.

In the magneto-optical recording medium of Embodiment 3 shown in FIG. 6, magnetic domain walls are successively displaced when the temperature of the recording film is increased by irradiation with a light beam, as are those in the magneto-optical recording medium of Embodiment 1. A reproduction signal from the magnetic domain the wall of which is moved is detected. For signal detection, a magnetic head such as a GMR head or a tunneling magnetoresistive (TMR) head is used.

The magneto-optical disk is irradiated with a light beam by using a waveguide to increase the temperature of the magneto-optical disk 30, thus enabling magnetic superresolution reproduction of a signal.

The magneto-optical disk 30 of Embodiment 3 is formed by forming a multilayer film including a magnetic layer on the above-described optical disk substrate 31. Lands are formed between grooves. The groove depth h is 65 nm from the upper surface of the lands. The lands is inverted V-shaped. The grooves are made magnetically independent of each other by the lands. In the magneto-optical disk 30 of Embodiment 3, the track pitch is 0.5 µm and the groove width is 0.4 µm.

The magneto-optical disk 30 constructed as shown in FIG. 6 is made by forming thin films on the optical disk substrate 31 placed in a stationary state in such a position as to face targets, as is that in Embodiment 2.

On the magneto-optical disk substrate 31, a 70 nm thick film of SiN is formed as the dielectric layer 32 by reactive sputtering. A magnetic film is formed on the dielectric layer 32 by DC magnetron sputtering using an alloy target.

A film of TbFeCoCr for the seed layer 33 (10 nm), a film of TbHoFeCo for the grain growth layer 34 (10 nm) and a film of TbFeCo for the recording layer 35 (100 nm) are formed by DC magnetron sputtering using alloy targets.

A film of TbFeCoAl is formed as the intermediate switching layer 36 to a thickness of 15 nm.

Films each having a thickness of 10 nm are successively formed as the reproduction layer 37 formed of GdFeCoCr by DC magnetron sputtering using four alloy targets formed of compositions Gd23Fe54Co7Cr16, Gd24Fe55Co9Cr12, Gd25Fe58Co10Cr7, and Gd26Fe58Co12Cr4 (content: mol %).

The second dielectric layer 38 formed of SiN is formed to 20 nm by reactive sputtering.

The lubrication layer 39 having a carbon material as a main component is formed by high-speed spin coating application on the dielectric layer 38.

In film forming of the seed layer 33 formed of TbFeCoCr, the film forming Ar pressure is 0.5 Pa and the film forming rate is 1 nm/sec. In film forming of the grain growth layer 34 formed of TbHoFeCo on the seed layer 33, the film forming Ar pressure is 2.0 Pa and the film forming rate is 1.5 nm/sec.

The recording layer 35 formed of TbFeCo is a magnetic film which has a compensation composition temperature of 30° C., and the composition of which is controlled so that the Curie temperature is 310° C.

When this film is formed, the film forming Ar pressure is 3.5 Pa and the film forming rate is 6 nm/sec. The magnetic film can be formed by using the seed layer 33 and the grain growth layer 34 as under layers so that the column width in the column configuration is 13 nm.

The intermediate switching layer 36 formed of TbFeCoAl on the recording layer has a Curie temperature of 145° C. The transition metal component is predominant in the intermediate switching layer 36 at any temperature below the Curie temperature.

When this layer is formed, the film forming Ar pressure is 2 Pa and the film forming rate is 5 nm/sec.

The reproduction layer 37 formed of GdFeCoCr is formed by successively laminating four layers differing in composition: a layer having a compensation composition temperature of 60° C. and a Curie temperature of 135° C., a layer having a compensation composition temperature of 115° C. and a Curie temperature of 175° C., a layer having a compensation composition temperature of 160° C. and a Curie temperature of 220° C., and a layer having a compensation composition temperature of 185° C. and a Curie temperature of 270° C.

When these layers are formed, the film forming Ar pressure is 0.6 Pa and the film forming rate is 10 nm/sec.

On the optical disk substrate 31, lands inverted V-shaped are formed at the boundaries between grooves. The groove depth h is 65 nm from the upper surface of the lands.

The grooves are made magnetically independent of each other by the lands.

The track pitch and the groove width of the optical disk substrate 31 in Embodiment 3 are 0.5 μm and 0.4 μm, respectively.

In the arrangement using glass as the material of the optical disk substrate formed as described above, grooves can be formed on the substrate by transferring the groove shape by using a stamper corresponding to the master disk and a photopolymer even in a case where the track pitch and the land width are small.

Further, coupling at the track boundaries between grooves which are recording/reproduction regions can be interrupted with reliability by increasing the slope angle of the land portions of the magneto-optical recording medium or changing the surface roughness of the sloped portions.

On the magneto-optical disk 30 in Embodiment 3, film forming can be performed by a stationary-opposition sputtering method so that variations in orientation of sputtering particles are reduced in comparison with the case of performing film forming while rotating the optical disk substrate, etc.

Therefore, the recording film composition can be made uniform according to the target composition distribution and the magnetic film can be deposited and grown in a direction perpendicular to the film surface. This effect is higher when forming a columnar structure.

Containing Ho in the rare-earth metal in the grain growth layer is effective in increasing the column width in the column configuration.

Figure 8:
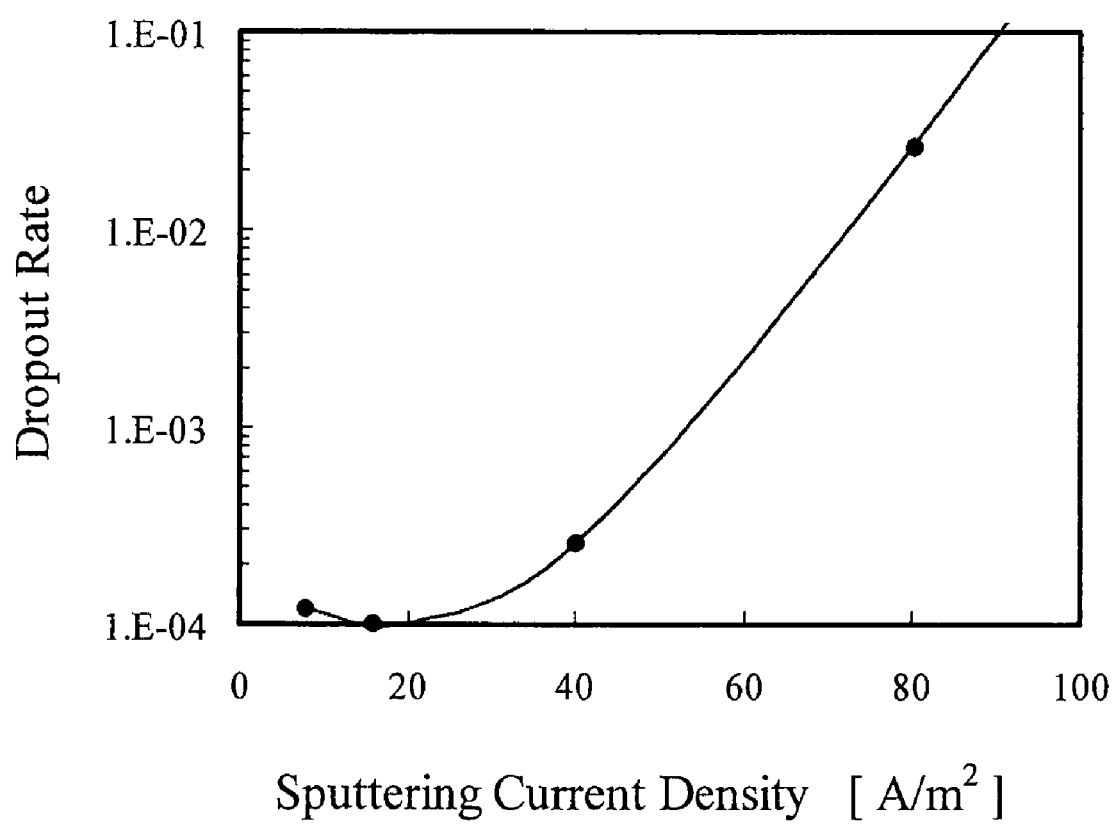
FIG. 8 is a characteristic diagram showing a dependence of the dropout rate on a condition for film forming of the seed layer for nucleus formation in the magneto-optical recording medium in Embodiment 3 of the present invention.

FIG. 8 shows a dependence of the dropout rate (the proportion of defective recording marks) on the sputtering current density on the magnetic thin film at the time of film forming of the seed layer 353 with respect to a recording mark of 100 nm.

The dropout rate is a rate at which recording marks different from a mark length (or a frequency) corresponding to a recorded signal occur.

For example, a dropout rate of $1.0 \times 10^{-1}$ means that one mark in ten recording marks has a mark length different from 100 nm and may cause an error.

As shown in FIG. 8, the dropout rate increases abruptly when the current density for sputtering of the seed layer becomes 100 A/m² or higher.

The structure of the magnetic thin film in the seed layer is a fine amorphous structure and no columnar structure can be obtained from the seed layer in a single state no matter what the value of the current density at the time of sputtering is.

However, the recording layer formed on the seed layer or via the grain growth layer can have a columnar film structure in which columns are perpendicularly grown.

In actuality, the dropout rate can be reduced by changing the current density for the seed layer at the time of sputtering. More specifically, the dropout rate can be effectively reduced at a film forming rate corresponding to a current density in substantially the range from 20 to 80 A/cm².

For example, 1.E-01 indicates that defects occur at a rate of substantially 0.1 (that is, 10% of recorded marks are not recorded or the recorded marks are changed in size) and the defective recording marks cannot be detected as a normal recording mark.

Figure 7:
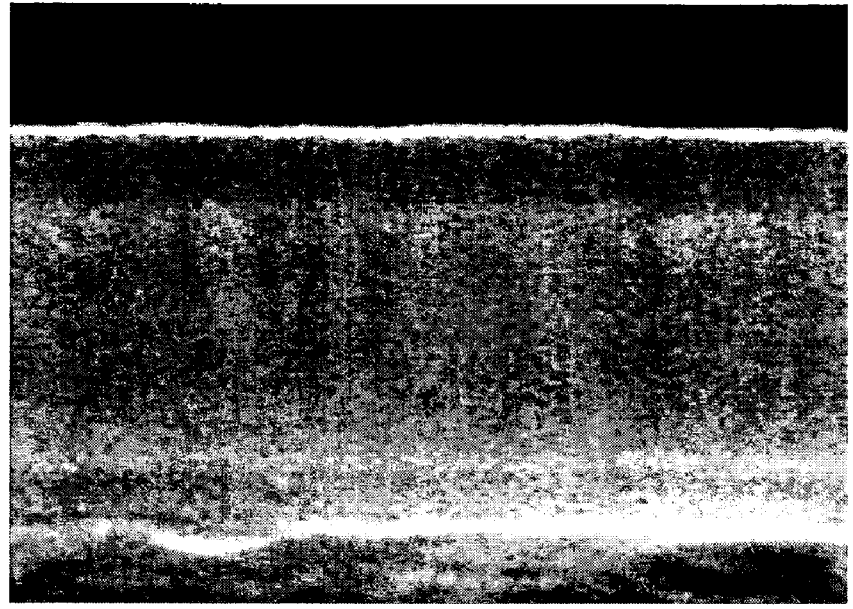
FIG. 7(a) is a photographic image showing a result of SEM observation of a cross section of the magneto-optical recording medium in Embodiment 3 of the present invention.
FIG. 7(b) is a photographic image showing a result of SEM observation of a cross section of the magneto-optical recording medium in Embodiment 3 of the present invention in a case where a seed layer for nucleus formation is not provided.
Figure 7:
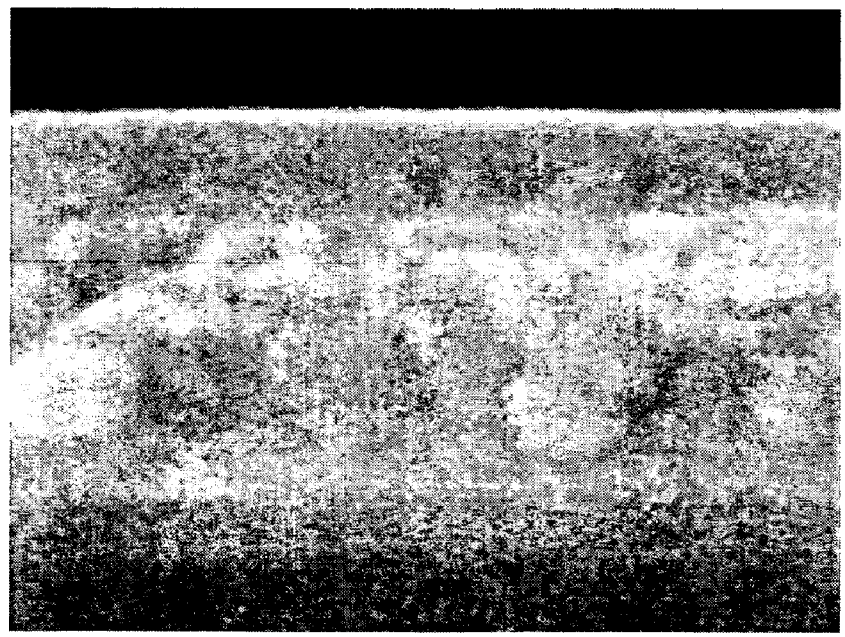

As shown in FIG. 7(a), it is observed that the magnetic thin film in the recording layer 35 formed of TbFeCo and made on the seed layer 33 and the grain growth layer 34 has a columnar structure or a column configuration in which columns extend in a direction perpendicular to the film surface.

In contrast, in a case where there is no seed layer provided as a nucleus for forming a columnar structure and where the recording layer is formed only on the grain growth layer 34, any structure in which film growth is effected in a direction perpendicular to the film surface is not formed, as shown in FIG. 7(b). In this case, while the grains are large, Ms.Hc is small (seethe curve (c) in FIG. 3) and microscopic magnetic domains cannot be formed, resulting in occurrence of dropouts.

For the function of the seed layer capable of forming a column configuration, a columnar structure can be formed at a film forming rate substantially within the range from 0.2 to 5 nm/sec (more preferably, within substantially the range from 0.4 to 3 nm/sec corresponding to the above-described current density range from substantially 20 to 80 A/m²).

The deposition film forming rate for magnetic film can be set by adjustment of input power and placement of film thickness/film distribution correction plate or the like.

Thus, the column width in the column configuration in the recording layer is set to substantially 5 nm or greater to enable stable recording/reproduction to a mark length of substantially 100 nm or less. In addition, recording magnetic domains are stably formed and recorded by a recording/reproduction method using thermal assistance with a waveguide or the like and using a magnetic head such as a GMR head, and a signal is reproduced.

As described above, the magneto-optical recording medium of Embodiment 3 has a magnetic film capable of reproduction using DWDD, and a stationarily opposed target arrangement is used to reduce a tact time in the manufacturing process.

A magneto-optical recording medium can also be realized which has improved signal characteristics at the time of high-density recording by virtue of the recording layer with a columnar structure that is controlled by the under layer.

Further, at the time of overwriting by information signal rewriting, the overwrite power margin can be increased by utilizing the arrangement having regions in which magnetic separate is effected by using land portions, laser annealing or the like.

As described above, the magneto-optical recording medium of Embodiment 3, by virtue of the structure with a under layer, has a construction in which a columnar film structure is provided in a recording layer, more specifically a construction in which a recording layer having a column configuration of a structural unit width substantially in the range from 2 to 40 nm (more preferably, in the range from 5 to 20 nm) is formed.

If the recording layer is formed so that its film thickness is substantially 50 nm or more (more preferably, 60 to 200 nm), the stability of recording magnetic domains can be improved and improved reproduction signal characteristics can be obtained even when the mark length is short.

A method and apparatus for recording and reproduction using one of the magneto-optical recording mediums in the embodiments of the present invention will next be described.

The apparatus for recording and reproduction using one of the magneto-optical recording mediums in the embodiments of the present invention comprises a magneto-optical recording reproduction apparatus arranged to enable recording and reproduction using the above-described magneto-optical recording medium in accordance with the embodiment at a reproduction power higher than an ordinary level.

The method for recording and reproduction using one of the magneto-optical recording mediums in the embodiments of the present invention comprises a reproduction method in which recording magnetic domains formed in the recording layer of the magneto-optical recording medium are transferred into the reproduction layer and a recorded information reproduction signal is detected by displacing the domain walls in the reproduction layer.

This recording and reproduction method using the magneto-optical recording medium is a method of performing, recording, reproduction and erasing of information by using laser light. A laser light spot is moved relative to the magneto-optical recording medium at the time of reproduction.

The magneto-optical recording medium is irradiated with the laser light spot on the reproduction layer side to form thereon a temperature distribution having a gradient along the direction in which the laser light spot is moved, while a tracking control is being performed by using reflected light from the magneto-optical recording medium.

When this temperature distribution is formed, a force is applied to a domain wall formed in the reproduction layer to move the domain wall toward a place of a higher temperature. A temperature distribution having a temperature range higher than the temperature range in which this force becomes larger than the force of coupling exerted from the recording layer through the intermediate layer is formed in the reproduction layer.

Magnetic domains for transfer of information from the recording layer are formed in the reproduction layer, and the information formed as enlarged domains by domain wall displacements in the reproduction layer is detected as changes in the rotation of the plane of polarization of reflected light from the incident light spot.

Alternatively, a magnetic head is used to record or erase information while the temperature of the magneto-optical recording medium is increased by laser light, and the information is reproduced by using a GMR head.

At the time of recording of information, the magneto-optical recording medium is irradiated with the laser light spot moved relative to the magneto-optical recording medium, and the magnetic head is placed on the recording layer or reproduction layer side of the magneto-optical recording medium.

The direction of magnetic field is modulated according to the information to be recorded to record the information in the recording layer of the magneto-optical recording medium while tracking control is being performed.

At the time of reproduction of information, the magneto-optical recording medium is irradiated with the laser light spot to form a temperature distribution having a gradient along the direction of movement of the magneto-optical recording medium.

The GMR head for reproduction of information is placed on the reproduction layer side, and magnetic domains transferred and formed for the recorded information from the recording layer through the intermediate layer are moved to a place of a higher temperature by the temperature gradient in the reproduction layer.

The information corresponding to the magnetic domains formed in an enlarged state by domain wall displacements is detected with the GMR head.

At this time, if the film composition varies in the depth direction of the reproduction layer, the information is detected by magnetic domain enlargement based on domain wall displacements of the recording magnetic domains transferred step by step.

Further, in an arrangement in which the coupling force produced through the intermediate layer of the magneto-optical recording medium is one of a magnetic coupling force, an exchange coupling force and a static magnetic coupling force, transfer from only a temperature range in which a signal can be transferred by the magnetic coupling force between the recording layer and the reproduction layer is performed.

Transferred magnetic domains are enlarged to detect the signal.

According to the present invention, as described above, an arrangement is provided which includes a magnetic film capable of reproduction using the above-described DWDD, and in which magnetic separate is effected in a region at the boundary between a track region where recorded information can be rewritten and a track adjacent to this track region.

The desired mobility of domain walls in the magneto-optical recording medium can be ensured thereby, and the arrangement in which the columnar structural unit in the recording layer is larger than that in the reproduction layer enables stabilization of recording domains in the recording layer.

A recording/reproduction method can also be realized which ensures the desired domain wall mobility at the time of signal reproduction of magnetic domains transferred into the reproduction layer, and which enables detection of a reproduction signal with stability.

In each of the magneto-optical recording mediums in the above-described embodiments, an optical disk substrate made of polycarbonate or polyolefin or a glass substrate with a photopolymer is used. However, such an optical disk substrate is not exclusively used. An optical disk substrate using an arrangement in which a guide groove or prepits are directly formed on a glass member, or an arrangement in which an epoxy resin or any other plastic material is used, or a disk substrate consisting of metallic material may suffice.

The optical disk substrate of this embodiment has been described with respect to a magneto-optical recording medium having a spiral or annular guide groove or prepits for light spot tracking guidance.

However, any other optical disk substrate, e.g., one on which a meandering spiral guide groove having address information or prepits for a meandering tracking guide for a sample servo system or the like are formed, or a planar disk substrate may alternatively be used.

The track pitch of the optical disk substrate of this embodiment is substantially 0.5 to 0.8 μm, and the groove width is substantially 0.4 to 0.6 μm.

However, the track pitch and the groove width are not limited to these values. Rectangular or inverted V-shaped lands or grooves may be used between information recording track grooves in the above-described arrangement.

Also, grooves or land portions having a width of substantially 0.2 to 0.8 μm may be formed between lands or grooves where information is recorded, such that shutoff is effected between the recording tracks and the track pitch is substantially 1.0 µm or less.

The track pitch may be further reduced to realize a magneto-optical recording medium of a higher density.

The surface roughness of the land surfaces and the surface roughness of the sloped surfaces between the land surfaces and grooves may be increased. Also, the cavities in grooves where information is recorded may be formed on a smooth surface to effect magnetic separate at the boundaries between grooves adjacent to each other or between the land surfaces and the sloped surfaces.

An advantageous improvement in domain wall mobility characteristics in DWDD operation can be achieved in this manner. Further, an improved magneto-optical recording medium can be realized by annealing between information recording tracks based on the DWDD method.

The magneto-optical recording mediums in the above-described embodiments have been described with respect to arrangements in which SiN film and ZnSSiO$_2$ film are used as first and second dielectric layers.

However, other films, e.g., ZnS film or films of other chalcogen compounds, films of oxides including TaO$_2$, films of nitrides including AlN, or thin films of compounds formed from such materials may alternatively be used.

Also, an arrangement may be adopted in which the film thickness of the dielectric layer is set within the range from 20 to 300 nm to increase the signal amount by an enhancement effect.

As described above, as the magnetic films forming the layers in the magneto-optical recording mediums in the above-described embodiments, GdFeCoAl and GdFeCoCr are used for the reproduction layer.

Also, TbDyFeCoAl, TbDyFeCr, TbFeCoCr and TbHoFeCoAl are used for the control layer and the intermediate switching layer.

Also, TbFeCo, TbHoFeCo and TbFeCoCr are used for the recording layer.

Also, GdFeCoAl and TbFeCoCr are used for the seed layer.

Also, TbFeCoCr and TbHoFeCo are used for the grain growth layer.

However, any of magneto-optical materials using rare-earth-transition metal ferrimagnetic amorphous alloys, such as TbFe, TbHoFe, TbCo, GdCo, GdTbFe, GdTbFeCo, GdTbHoFeCo and DyFeCoGdFeCoSi, or using as polycrystalline materials Mn magnetic film, such as MnBi, MnBiAl and PtMnSn, platinum group-transition metal alloys, such as garnet, PtCo and PdCo, and gold or platinum group-transition metal periodic structure alloy films, such as Pt/Co and Pd/Co may also be used.

A recording film formed of a plurality of recording layers containing some of these materials and differing in the kind of material or in composition may be formed.

An element such as Cr, Al, Ti, Pt, or Nb for improving corrosion resistance may be added to the above-described magnetic layers.

Further, the above-described dielectric layer maybe used as the seed layer and the grain growth layer.

While the arrangements in which the rare-earth metal is Tb, Gd, Dy or contains Ho have been described, other arrangements in which any other metallic material is added and the columnar structural unit is increased may have the same effect.

The embodiments have been described with respect to the recording film structure in which the reproduction layer, the control layer, the intermediate switching layer and the recording layer or like layers are combined, and in which the film thickness of the reproduction layer and the recording layer is 30 to 60 nm and the film thickness of the control layer and the intermediate switching layer is substantially 5 to 15 nm.

However, this film structure is not exclusively used. The film thickness may be set within substantially the range from 5 to 200 nm to obtain a magnetic coupling force between the recording layer and the reproduction layer large enough to satisfy the characteristics in accordance with the present invention.

More preferably, for example, the thickness of the reproduction layer is set substantially within the range from 10 to 100 nm, the thickness of the control layer substantially within the range from to 5 to 50 nm, the thickness of the intermediate switching layer substantially within the range from to 5 to 50 nm, and the thickness of the recording layer substantially within the range from 30 to 200 nm.

Further, an arrangement using a recording assistant layer, a transfer control layer or the like, or a magnetic film for improving the recording/reproduction characteristics may be used.

As the intermediate switching layer, a magnetic film in a multilayer structure may be provided in which the composition or the magnetic domain wall energy density is changed in the film thickness direction.

The column structure forming layer may be such that the amount of Ar gas taken in is substantially 0.5 mol % or more, the film deposition rate at the time of film forming is substantially within the range from 0.2 to 5 nm/sec, so that a nucleus for a columnar structure can be provided.

The grain growth layer for controlling the column structure forming layer and the grain width of columns may be such that the film thickness is within the range from 5 to 50 nm (more preferably, from 5 to 20 nm).

This embodiment has been described with respect to the arrangement in which the under seed layer provided as a column structure forming layer is used as a portion of the reproduction layer or the recording layer, and in which the grain growth layer for controlling the column grain width is used as a portion of the intermediate layer or the recording layer.

However, any other arrangement, e.g., one using these layers as other recording films such as control layers for magnetic superresolution, or magnetic thin films such as a recording assistant layer and a transfer control layer having other functions.

Needless to say, in a case where the seed layer and the grain growth layers are formed as portions of such recording films, the same or higher effects can be obtained without increasing the number of recording films.

This embodiment has been described with respect to the under layers provided as amorphous magnetic thin films, the same effect can be obtained if non-magnetic thin films are used. More specifically, the material of the non-magnetic thin film may be an material containing at least one of Al, Ti, Ta, Cr, Cu, Ag, Au, Pt, Nb, Si and Ru. Further, oxide or nitride containing the above-described materials, or mixture containing these can be used.

The same effect can be obtained if the surface roughness Ra of the first under layer is set substantially within the range from 0.1 to 1.5 nm no matter what the material of the first under layer is, because the first under layer function as a nucleus for forming a columnar structure of the recording layer.

The second under layer is formed on the first under layer, with the construction using fine surface irregularities having a roughness Ra set substantially within the range from 0.2 to 2 nm.

The surface irregularities of the under layer achieve an advantageous improvement in film forming and film growth by the recording film forming molecules, in a case where the recording films are formed by a magnetron sputtering method as in this embodiment. The under layer with the above-described surface roughness can easily realize the forming of a columnar film structure and the controlling of the column structure.

If a method enabling detection of a recorded signal through optical head with a short wavelength and high N. A., a GMR magnetic head or the like is used, the same effects can be obtained even in the case of an arrangement using a recording layer formed as a single layer and having the above-described columnar structural unit, or a multilayer arrangement not using magnetic superresolution and magnetic domain enlargement by domain wall displacement.

Each of the magnetic layers forming the layers in the magneto-optical recording medium of the present invention can be made, for example, by a magnetron sputtering method using a target formed of a corresponding metallic material or an alloy target in which necessary materials are mixed and by the film forming Ar gas pressure, for example, substantially within the range from 0.5 to 2.0 Pa.

If film forming conditions such as the Ar gas pressure, and a bias magnetic field at the time of film forming or the kind of sputtering gas, etc., in this manufacturing process, and factors relating to the apparatus used for manufacturing are suitably controlled, the magneto-optical recording medium can be manufactured even when the rare-earth metal compositions including Gd of the magnetic films to be formed are changed.

For example, in a case where the Gd content ratio in GdFeCo is changed substantially within the range from 24 to 27%, a method of performing film forming by changing the film forming Ar gas pressure from substantially 1.2 to 0.4 Pa can be used.

Further, an arrangement may be adopted in which the columnar structural unit in the recording layer is increased by controlling conditions with respect to a film forming apparatus for multitarget sputtering, stationary-opposition sputtering or the like, whereby the coercive force Hc and the vertical magnetic anisotropy Ku are increased.

A signal in the recording layer can be transferred with reliability and reproduction based on magnetic domain enlargement can be performed by smoothly displacing magnetic domain walls in the reproduction layer.

While the arrangements in which an overcoat layer or a lubrication layer is directly formed on the dielectric layer on the recording layer have been described, an arrangement maybe adopted in which a heat absorbing layer is placed directly on the recording layer or on a dielectric layer formed on the recording layer.

The material of the heat absorbing layer may be an alloy material containing at least one of AlTi, Al, Cu, Ag and Au and having a thermal conductivity higher than that of the recording film.

The arrangement in which the overcoat layer (protective layer) is formed of an epoxy acrylate resin or an urethane resin has been described.

Alternatively, a structure may be used in which the layer is adhered to another layer of a base material by using an ultraviolet curing resin, a thermosetting resin, a hot-melt adhesive or the like.

A lubricating material containing alumina or the like or a combination of a protective film of diamondlike carbon or the like and a material such as perfluoropolyether (PFPE) may be used for the lubrication layer to achieve the same or higher effect.

While the magneto-optical recording medium according to the DWDD method and the reproduction method using DWDD method for reproduction from the recording medium have been described, other reproduction methods including a domain-wall-displacing magnetic domain enlargement reproduction method, a reproduction-domain enlargement reproduction method using shrinking operation, and a reproducing-magnetic-field-alternation reproduction method may be used.

An arrangement in which a recording and reproduction method is used and a columnar structure is formed in the recording layer to improve the signal quality and the recording density may suffice.

Even if the mark length is substantially 100 nm or less, there may be provided a high-density recording and reproduction process in which the stability of microscopic magnetic domains is improved, and information can be reproduced with stability from the reproduction layer after transfer into the reproduction layer can be performed. Even in such a case, the same or higher effects of the present invention can be achieved.

As is apparent from the above description, the present invention enables stabilization of recording magnetic domains even in the case of high-density recording and reproduction signal enlargement by stable displacement of transferred magnetic domains based on the DWDD method.

Also, a magneto-optical recording medium having improved recording/reproduction characteristics during repeated recording and reproduction of information can be realized.

According to the present invention, the arrangement in which a recording layer having a columnar structure is formed by using a under layer makes it possible to realize a magneto-optical recording medium used in the DWDD method and having improved characteristics even when the recording mark is small.

According to the present invention, as described above, the resolution can be improved for an information signal recorded at a high density on a magneto-optical recording medium when it is reproduced without a restriction due to an optical diffraction limit.

The data transfer rate can be improved and the characteristics of transfer of recording magnetic domains into the reproduction layer can be stabilized, thereby improving the stability of the characteristics of a reproduction signal from magnetic domains transferred by the DWDD method.

A magneto-optical recording medium capable of increasing the signal amplitude and having a high recording density and improved signal characteristics can be provided.

Further, reproduction process can be performed in such a manner that superimposed signal is reduced. Therefore, various margins can be increased and the manufacturing costs of the magneto-optical recording medium and the recording and reproduction apparatus can be advantageously reduced.

The present invention has the advantage of improving the recording density and the transfer rate in magneto-optical recording.

What is claimed is:
1. A magneto-optical recording medium comprising:
a recording layer having a plurality of columns; and a first under layer which is placed below said recording layer and which functions as a nucleus for said columns, wherein the width of a structural unit of said first under layer is substantially 2 nm or less and said first under layer is a magnetic thin film and has an amorphous structure, wherein the plurality of columns extends in a film thickness direction.

2. The magneto-optical recording medium according to claim 1, wherein said first under layer is formed as a portion of said recording layer.

3. The magneto-optical recording medium according to claim 1, wherein said first under layer has on the side of said recording layer a portion in which the density is changed.

4. The magneto-optical recording medium according to claim 1, wherein said first under layer takes in substantially 0.5 mol % or more inert gas.

5. The magneto-optical recording medium according to claim 4, wherein said inert gas contains at least one of Ar, Ne, Kr and Xe.

6. The magneto-optical recording medium according to claim 1, wherein the film thickness of said first under layer is substantially within the range from 5 to 50 nm.

7. The magneto-optical recording medium according to claim 1, wherein said amorphous structure is an amorphous structure which is random on the order of atoms.

8. The magneto-optical recording medium according to claim 1, wherein the width of the columns of said recording layer is larger than the width of the structural unit of said first under layer.

9. The magneto-optical recording medium according to claim 1, wherein said recording layer is more porous than said first under layer.

10. The magneto-optical recording medium according to claim 1, wherein said recording layer is magnetically coupled to said first under layer.

11. The magneto-optical recording medium according to claim 1, wherein the width of a structural unit of columns in said recording layer is substantially within the range from 2 to 40 nm.

12. The magneto-optical recording medium according to claim 1, wherein the density of said recording layer is substantially within the range from 2.0 to 5.0 $g/cm^3$.

13. The magneto-optical recording medium according to claim 1, wherein the film thickness of said recording layer is substantially within the range from 40 to 300 nm.

14. The magneto-optical recording medium according to claim 1, wherein said recording layer has a multilayer structure.

15. The magneto-optical recording medium according to claim 1, wherein the surface roughness Ra of said first under layer is substantially within the range from 0.1 to 1.5 nm.

16. The magneto-optical recording medium according to claim 1, wherein said recording layer takes in substantially 0.5 mol % or more inert gas.

17. The magneto-optical recording medium according to claim 16, wherein said inert gas contains at least one of Ar, Ne, Kr and Xe.

18. The magneto-optical recording medium according to claim 1, further comprising a second under layer and through which the width of said columns is controlled.

19. The magneto-optical recording medium according to claim 18, wherein said second under layer is a magnetic thin film of an amorphous structure.

20. The magneto-optical recording medium according to claim 18, wherein said second under layer is formed as a portion of said recording layer.

21. The magneto-optical recording medium according to claim 18, wherein said second under layer has a plurality of columns extending in the direction perpendicular to the layers.

22. The magneto-optical recording medium according to claim 21, wherein the width of the columns of said second under layer is substantially within the range from 2 to 40 nm.

23. The magneto-optical recording medium according to claim 18, wherein the film thickness of said second under layer is substantially within the range from 5 to 50 nm.

24. The magneto-optical recording medium according to claim 18, wherein said recording layer is magnetically coupled to said second under layer.

25. The magneto-optical recording medium according to claim 18, wherein said recording layer is formed of a thin film of an alloy of a predetermined rare-earth metal and a predetermined transition metal;

said first under layer is formed of a thin film of an alloy of a predetermined rare-earth metal and a predetermined transition metal; and said second under layer is formed of a thin film of an alloy of a predetermined rare-earth metal and a predetermined transition metal.

26. The magneto-optical recording medium according to claim 25, wherein the rare-earth metal is at least one of Tb, Gd, Dy and Ho.

27. The magneto-optical recording medium according to claim 18, wherein said second under layer is a non-magnetic thin film.

28. The magneto-optical recording medium according to claim 27, wherein said non-magnetic thin film contains at least one of Al, Ti, Ta, Cr, Cu, Ag, Au, Pt, Nb, Si and Ru.

29. The magneto-optical recording medium according to claim 18, wherein the surface roughness Ra of said second under layer is substantially within the range from 0.2 to 2 nm.

30. A method of recording on a magneto-optical recording medium comprising providing a recording layer having a plurality of columns, providing a first under layer which is placed below the recording layer and which functions as a nucleus for the columns, wherein the width of a structural unit of said first under layer is substantially 2 nm or less and said first under layer is a magnetic thin film and has an amorphous structure, and wherein the plurality of columns extends in a film thickness direction, and a data write step of writing predetermined data to the recording layer.

31. A method of reproduction from a magneto-optical recording medium comprising providing a recording layer having a plurality of columns, providing a first under layer which is placed below the recording layer and which functions as a nucleus for the columns, wherein the width of a structural unit of said first under layer is substantially 2 nm or less and has an amorphous structure, and wherein the plurality of columns extends in a film thickness direction, and a data readout step of reading out predetermined data written to the recording layer.

* * * * *

UNITED STATES PATENT AND TRADEMARK OFFICE
CERTIFICATE OF CORRECTION

PATENT NO.        : 7,235,313 B2
APPLICATION NO. : 10/681567
DATED             : June 26, 2007
INVENTOR(S)      : Motoyoshi Murakami et al.

It is certified that error appears in the above-identified patent and that said Letters Patent is hereby corrected as shown below:

On the Title Page, Item (73) Assignee: "Matsushita Electic Industrial Co., Ltd." should read --Matsushita Electric Industrial Co., Ltd.--.

On the Title Page, Item (56) References Cited, FOREIGN PATENT DOCUMENTS "WO    WO 03/046905   6/2003" should read -- WO    03/046905    6/2003--.

At Column 30, line 56, claim 31 of the Letters Patent, after "or less and" please add --said first under layer is a magnetic thin film and--.

Signed and Sealed this

Fourth Day of December, 2007

JON W. DUDAS
*Director of the United States Patent and Trademark Office*